United States Patent
Sakai et al.

(10) Patent No.: US 9,300,844 B2
(45) Date of Patent: Mar. 29, 2016

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Hiroyuki Sakai, Chigasaki (JP); Tetsuya Suwa, Yokohama (JP); Yuto Kajiwara, Kawasaki (JP); Akitoshi Yamada, Yokohama (JP); Kentaro Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/578,150

(22) Filed: Dec. 19, 2014

(65) Prior Publication Data

US 2015/0181082 A1 Jun. 25, 2015

(30) Foreign Application Priority Data

Dec. 24, 2013 (JP) ................. 2013-265235

(51) Int. Cl.
*H04N 1/60* (2006.01)
*G06K 15/02* (2006.01)
*H04N 1/405* (2006.01)

(52) U.S. Cl.
CPC .............. *H04N 1/6027* (2013.01); *G06K 15/02* (2013.01); *G06K 15/1881* (2013.01); *H04N 1/4052* (2013.01)

(58) Field of Classification Search
CPC . H04N 19/115; H04N 19/127; H04N 19/146; H04N 19/162; H04N 19/17; H04N 19/186; H04N 19/63; H04N 5/772; H04N 5/907; H04N 9/8047; H04N 19/126; H04N 19/14; H04N 19/61; G06F 3/12; G06K 15/1814

USPC .............. 348/229.1; 375/E7.049, E7.062, 375/E7.065, E7.141, E7.166, E7.182, 375/E7.14, E7.162, E7.211, 240.21; 386/E5.072; 358/2.1, 3.26; 382/238, 382/239

See application file for complete search history.

(56) References Cited

U.S. PATENT DOCUMENTS

| | | | | |
|---|---|---|---|---|
| 6,480,300 | B1 * | 11/2002 | Aoyama ..................... | 358/1.9 |
| 6,876,770 | B2 * | 4/2005 | Kuniba ...................... | 382/239 |
| 7,185,964 | B2 * | 3/2007 | Kanda et al. ............... | 347/15 |
| 7,221,483 | B2 * | 5/2007 | Yagishita et al. .......... | 358/3.13 |
| 7,382,402 | B2 * | 6/2008 | Yamamoto et al. ........ | 348/229.1 |
| 7,561,752 | B2 * | 7/2009 | Monobe et al. ............ | 382/268 |
| 2002/0122489 | A1 * | 9/2002 | Kuniba .................. | 375/240.21 |

(Continued)

FOREIGN PATENT DOCUMENTS

JP 4053460 B2 2/2008

*Primary Examiner* — Negussie Worku
(74) *Attorney, Agent, or Firm* — Canon USA, Inc. IP Division

(57) ABSTRACT

The number of gradation levels to be obtained after lossy-compressed data corresponding to a predetermined number of gradation levels is expanded and gradation conversion is performed is determined in such a manner that the number of gradation levels is determined to be a first number of gradation levels in a case where the degree of compression when the data to be processed is compressed in lossy compression is more than a first threshold value, and the number of gradation levels is determined to be a second number of gradation levels in a case where the degree of compression is less than or equal to the first threshold value, the first number of gradation levels being smaller than the second number of gradation levels.

18 Claims, 16 Drawing Sheets

(56) References Cited

U.S. PATENT DOCUMENTS

| | | | |
|---|---|---|---|
| 2006/0119712 A1* | 6/2006 | Yamamoto et al. | 348/229.1 |
| 2007/0009163 A1* | 1/2007 | Sasaki et al. | 382/238 |
| 2007/0229866 A1* | 10/2007 | Dai et al. | 358/1.9 |
| 2010/0239166 A1* | 9/2010 | Zhang et al. | 382/176 |
| 2010/0329559 A1* | 12/2010 | Shindo et al. | 382/172 |
| 2013/0155466 A1* | 6/2013 | Shiraishi | 358/3.06 |
| 2015/0002902 A1* | 1/2015 | Akiba et al. | 358/2.1 |
| 2015/0092240 A1* | 4/2015 | Miyake et al. | 358/2.1 |

\* cited by examiner

FIG. 4

| (R, G, B) | DEVICE RGB (R, G, B) |
|---|---|
| (0, 0, 0) | (0, 0, 0) |
| (0, 0, 16) | (0, 0, 10) |
| (0, 0, 32) | (0, 3, 28) |
| ⋮ | ⋮ |
| ⋮ | ⋮ |
| (255, 255, 240) | (248, 255, 230) |
| (255, 255, 255) | (255, 255, 255) |

| (R, G, B) | (C, M, Y, K) |
|---|---|
| (0, 0, 0) | (0, 0, 0, 255) |
| (0, 0, 16) | (18, 16, 0, 246) |
| (0, 0, 32) | (33, 31, 0, 224) |
| ⋮ | ⋮ |
| ⋮ | ⋮ |
| (255, 255, 240) | (0, 0, 15, 0) |
| (255, 255, 255) | (0, 0, 0, 0) |

FIG. 10

| Q TABLE | NUMBER OF GRADATION LEVELS = 2 | NUMBER OF GRADATION LEVELS = 3 | NUMBER OF GRADATION LEVELS = 4 |
|---|---|---|---|
| Qa | 0 | 5 | 150 |
| Qb | 10 | 100 | 2000 |
| Qc | 50 | 1000 | 5000 |

Q TABLE: Qa

Q TABLE: Qb

Q TABLE: Qc

FIG. 12

| DEGREE OF COMPRESSION | Q TABLE | NUMBER OF GRADATION LEVELS | |
| --- | --- | --- | --- |
| | | NORMAL PAPER STANDARD | NORMAL PAPER HIGH QUALITY |
| 80 OR MORE | Qa | 3 | 4 |
| 50 OR MORE AND LESS THAN 80 | Qb | 3 | 3 |
| LESS THAN 50 | Qc | 2 | 3 |

FIG. 14A
Q: 50

| 8 | 6 | 5 | 8 | 12 | 20 | 26 | 30 |
|---|---|---|---|----|----|----|----|
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

FIG. 14B
Q: 70

| 4 | 3 | 2 | 4 | 6 | 10 | 13 | 15 |
|---|---|---|---|---|----|----|----|
| 3 | 3 | 3 | 5 | 6 | 14 | 15 | 14 |
| 3 | 3 | 4 | 6 | 10 | 14 | 17 | 14 |
| 3 | 4 | 5 | 7 | 13 | 22 | 20 | 15 |
| 4 | 5 | 9 | 14 | 17 | 27 | 26 | 19 |
| 6 | 9 | 14 | 16 | 20 | 26 | 28 | 23 |
| 12 | 16 | 19 | 22 | 26 | 30 | 30 | 25 |
| 18 | 23 | 24 | 24 | 28 | 25 | 26 | 25 |

FIG. 14C
Q: 90

| 2 | 1 | 1 | 2 | 3 | 5 | 6 | 7 |
|---|---|---|---|---|---|---|---|
| 1 | 1 | 1 | 2 | 3 | 7 | 7 | 7 |
| 1 | 1 | 2 | 3 | 5 | 7 | 8 | 7 |
| 1 | 2 | 2 | 3 | 6 | 11 | 10 | 7 |
| 2 | 2 | 4 | 7 | 8 | 13 | 13 | 9 |
| 3 | 4 | 7 | 8 | 10 | 13 | 14 | 11 |
| 6 | 8 | 9 | 11 | 13 | 15 | 15 | 12 |
| 9 | 11 | 12 | 12 | 14 | 12 | 13 | 12 |

INFORMATION PROCESSING APPARATUS, INFORMATION PROCESSING METHOD, AND STORAGE MEDIUM

BACKGROUND

1. Field of the Disclosure

The present disclosure relates to an information processing apparatus, an information processing method, and a storage medium for determining the number of gradation levels to be obtained after gradation conversion is performed for reducing the number of gradation levels of data to be processed corresponding to a predetermined number of gradation levels.

2. Description of the Related Art

A printing apparatus that performs printing of images may perform printing of an image based on image data which has been compressed in a lossy-compression method. A Joint Photographic Expert Group (JPEG) method is an example of such a lossy-compression method. Image data compressed in the JPEG method is expanded, and an image based on the expanded image data is printed on a recording medium by a printing apparatus.

As described above, the JPEG method is a lossy compression method. Therefore, image degradation called mosquito noise may occur in an expanded image. The mosquito noise arises from quantization processing in JPEG compression. In the JPEG method, by quantization processing for an image which has been converted into a frequency by discrete cosine transform (DCT), in particular, information of a high-frequency component is eliminated. Accordingly, when expansion processing is performed, for example, a signal value which does not originally exist around edges within the expanded image may be generated as the above-mentioned mosquito noise.

In Japanese Patent No. 4053460, processing for eliminating mosquito noise from image data obtained by expanding compressed image data, is suggested. Specifically, image data obtained by expanding compressed image data is divided in units of blocks, noise determination processing is performed, and the type of noise and the degree of occurrence of noise are determined. Then, switching parameters (a quantization threshold value, an error determination threshold value, and a diffusion factor) in half tone processing for creating printing data, based on the noise determination result, is described in Japanese Patent No. 4053460.

In Japanese Patent No. 4053460, a determination is made based on an image on which expansion processing has been performed. Therefore, it may be impossible to distinguish whether a portion determined to be noise is generated by lossy compression and expansion or is included in the original image before compression and expansion. As a result, for example, even if the degree of compression in the lossy compression method is small and noise is less likely to occur, a portion included in the original image may be falsely determined to be noise and the portion may be eliminated from the image. Furthermore, for example, a similar problem may also occur when data other than image data, such as audio data compressed in the lossy compression method, is expanded.

SUMMARY

The present disclosure provides an information processing apparatus and an information processing method capable of appropriately determining, based on information corresponding to the degree of compression of lossy-compressed data to be processed, the number of gradation levels corresponding to the data.

Further features of the present invention will become apparent from the following description of exemplary embodiments with reference to the attached drawings.

BRIEF DESCRIPTION OF THE DRAWINGS

FIG. 4 illustrates an example of a color correction table.

FIG. 10 illustrates an example of the number of pixels calculated in S906, which corresponds to a combination of a Q table and the number of gradation levels.

FIG. 12 illustrates an example of a table illustrating the number of gradation levels corresponding to a Q factor representing the degree of compression.

FIGS. 14A, 14B, and 14C are diagrams illustrating examples of quantization tables stored in advance in a printing apparatus.

DESCRIPTION OF THE EMBODIMENTS

Hereinafter, embodiments of the present invention will be described. The embodiments described below are merely examples. The present invention is not limited to the embodiments described below.

Explanation of Hardware Configuration

Figure 1:
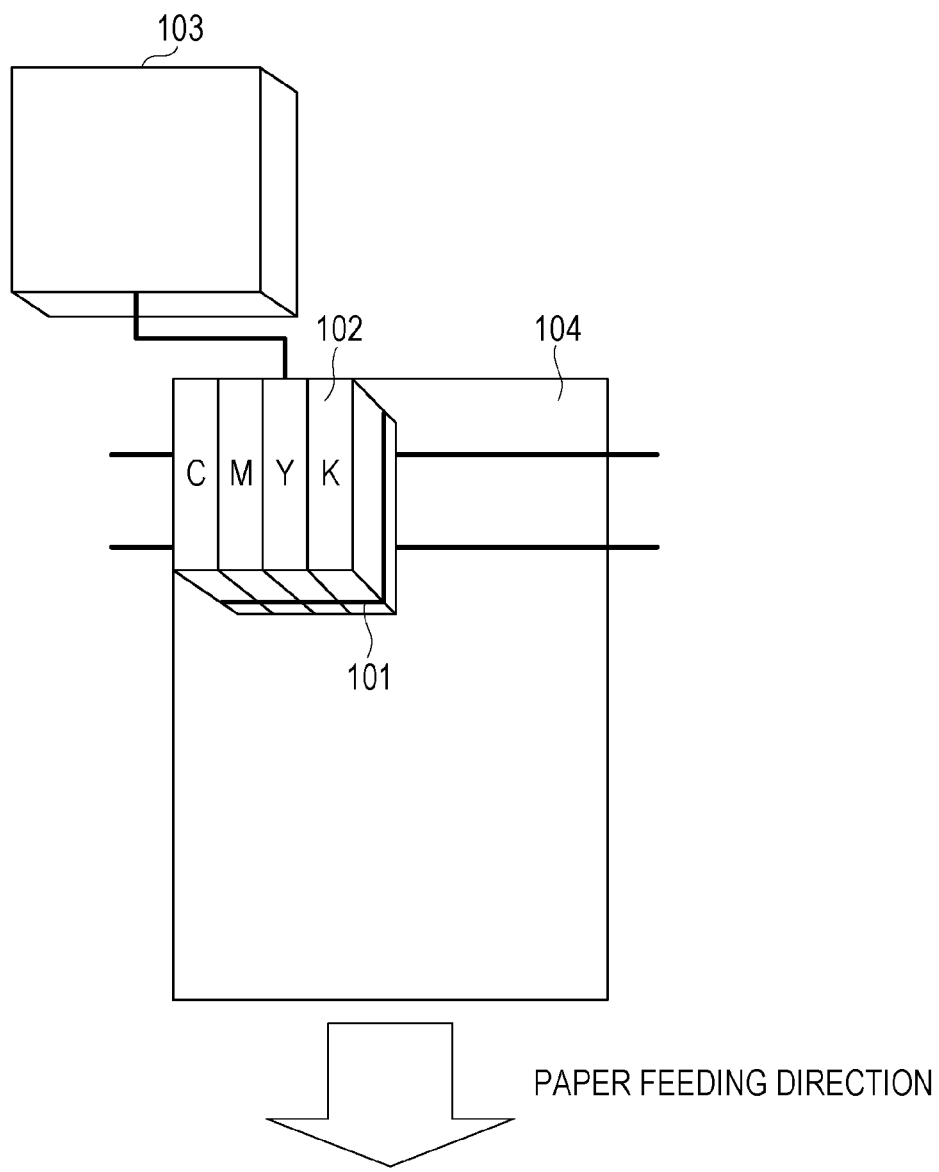
FIG. 1 is a diagram illustrating an example of an ink jet recording apparatus according to an embodiment.

FIG. 1 is a diagram illustrating an example of an ink jet recording apparatus according to an embodiment. An ink tank 102 filled with ink is mounted on a recording head 101. FIG. 1 illustrates an example in which ink of four colors is filled in the ink tank 102. An ink tank of any color may be installed. Ink tanks in which ink of the same color of different materials, such as dyes and pigments, is filled may be installed.

A control circuit portion 103 includes a storage part, an arithmetic operation part, and a communication part for driving the recording head 101. The recording head 101 receives a recording signal indicating whether or not ink ejection is necessary and a control signal indicating the timing of the ejection, and ejects ink based on the recording signal in accordance with the control signal. A recording medium 104, which is a recording medium, is supplied with ink ejected from the recording head 101 while being conveyed through a conveyance roller, which is not illustrated. Accordingly, an image is recorded on the recording medium 104.

In this embodiment, an ink jet method will be explained as an example of a recording method for use in a printing apparatus. However, a printing apparatus which performs printing by supplying toner by an electrophotographic method is also applicable.

Furthermore, a recording method in which ink is supplied while a carriage on which the recording head 101 and the ink tank 102 are mounted is performing scanning in a direction orthogonal to the conveyance direction of the recording medium 104, is illustrated in FIG. 1. However, the present invention is not limited to this. A printing apparatus may include a line head having a length equal to or longer than the length in the width direction of the recording medium 104 and perform printing without performing the scanning mentioned above.

Figure 2:
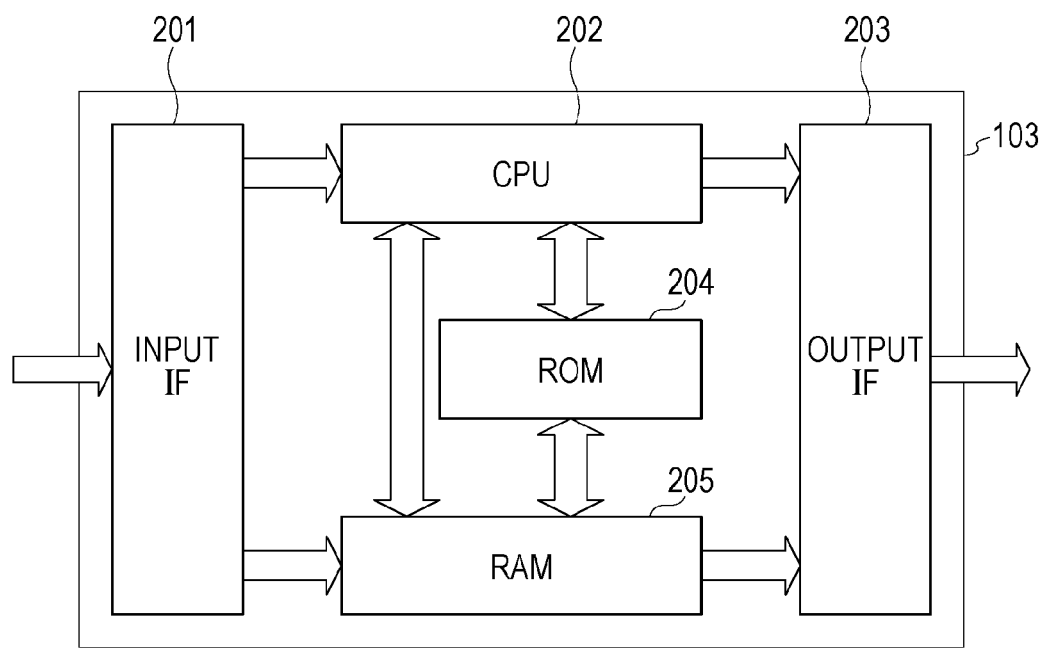
FIG. 2 is a block diagram illustrating a configuration of a control circuit portion.

FIG. 2 is a block diagram illustrating a configuration of the control circuit portion 103. The control circuit portion 103 includes an input interface 201, a central processing unit (CPU) 202, an output interface 203, a read-only memory (ROM) 204, and a random access memory (RAM) 205. The ROM 204 is a nonvolatile memory. A control program for controlling the control circuit portion 103 and the entire printing apparatus is stored in the ROM 204. The RAM 205 is a memory for storing the control program stored in the ROM 204 and various data including image data and various parameters.

The CPU 202 controls the control circuit portion 103 and the entire printing apparatus by reading the control program stored in the ROM 204, which is a nonvolatile memory, onto the RAM 205 and executing the control program on the RAM 205. More specifically, the CPU 202 receives an user instruction from an operation portion, an external computer, a smartphone, a tablet, and the like, which are not illustrated, and performs control in accordance with the instruction.

The input interface 201 receives input of image data to be recorded and a control signal for driving the recording head, from an external or internal memory, an external computer, and the like, which are not illustrated. The input interface 201 transmits the image data and the control signal to the RAM 205 and the CPU 202. At this time, the CPU 202 converts the image data into a recording signal for ink ejection by executing, on the RAM 205, the control program stored in the ROM 204. The thus converted recording signal is output from the output interface 203 as recording data, along with the control signal. The recording head 101 is driven by the output recording data and control signal, and an image is recorded on the recording medium 104.

For example, when image data compressed by JPEG method is input through the input interface 201, the CPU 202 performs JPEG expansion processing for the image data, and converts the expanded image data into a recording signal.

Although the CPU 202 performs JPEG expansion processing and conversion processing into a recording signal in the example of FIG. 2, the present invention is not limited to this. More specifically, a hardware circuit which performs the JPEG expansion processing and/or conversion processing may be provided separately from the control circuit portion 103, and the hardware circuit may perform the JPEG expansion processing and/or conversion processing.

In this embodiment, image data which has been compressed in the JPEG method, which is the lossy compression method, is input to the input interface 201, and the CPU 202 performs expansion processing for the image data and conversion processing into a recording signal. In the compression of the JPEG method, due to compression and expansion, information which does not exist in the original image before compression may be generated as mosquito noise. In particular, the visibility of characters in a document image which mainly contains characters may be degraded by mosquito noise generated around a character portion. For example, in the case where a document image in which mosquito noise has been generated is printed by an ink jet printing apparatus, occurrence of ink bleeding may reduce, in particular, the legibility of small characters, and ink is thus wasted.

In this embodiment, in gradation conversion processing into a recording signal, image data is converted with the number of gradation levels corresponding to the compression ratio. More specifically, in the case where the compression ratio is high and mosquito noise is likely to occur, a relatively small number of gradation levels, such as "2", is set. As described above, when the number of gradation levels is set to "2", for each pixel of an image, either "0 (ink ejection is unnecessary)" or "1 (ink ejection is necessary)" is determined.

For example, in the case where the number of gradation levels is set to "3", "4", or the like, a pixel at which mosquito noise has occurred may be determined to require ink ejection. In this case, if the number of gradation levels is set to "2" as described above, a result of "0 (ink ejection is unnecessary)" is obtained for the pixel at which mosquito noise has occurred. As a result, mosquito noise does not appear in a printing result. The details will be described later.

In this embodiment, an example in which acquisition of lossy-compressed image data, expansion processing for the lossy-compressed image data, creation of printing data by gradation conversion, and the like are performed in a printing apparatus is explained. For example, in the case where the above processing is performed by a printer driver in a host apparatus which is connected to a printing apparatus, the printer driver needs to be installed in the individual host apparatuses. Therefore, in the case where various devices, such as a personal computer (PC), a smartphone, and a tablet, cause a printing apparatus to perform printing through various interfaces, the printer driver needs to be installed in all these devices. Furthermore, since a printer driver may be provided for each type of a printing apparatus, in the case where a host apparatus causes printing apparatuses of different types to perform printing, a printer driver needs to be installed for each of the apparatus type.

In this embodiment, acquisition of lossy-compressed image data, expansion processing for the lossy-compressed image data, creation of printing data by gradation conversion, and the like are performed in a printing apparatus. Therefore, a host apparatus is able to cause a printing apparatus to perform printing by transmitting image data which has not been converted into printing data, even without processing by a printer driver. Furthermore, image data on which compression processing has been performed can be transmitted. Therefore, compared to the case where expanded data is transmitted, data to be printed can be transmitted to the printing apparatus more rapidly.

Block Diagram of Firmware

Figure 3:
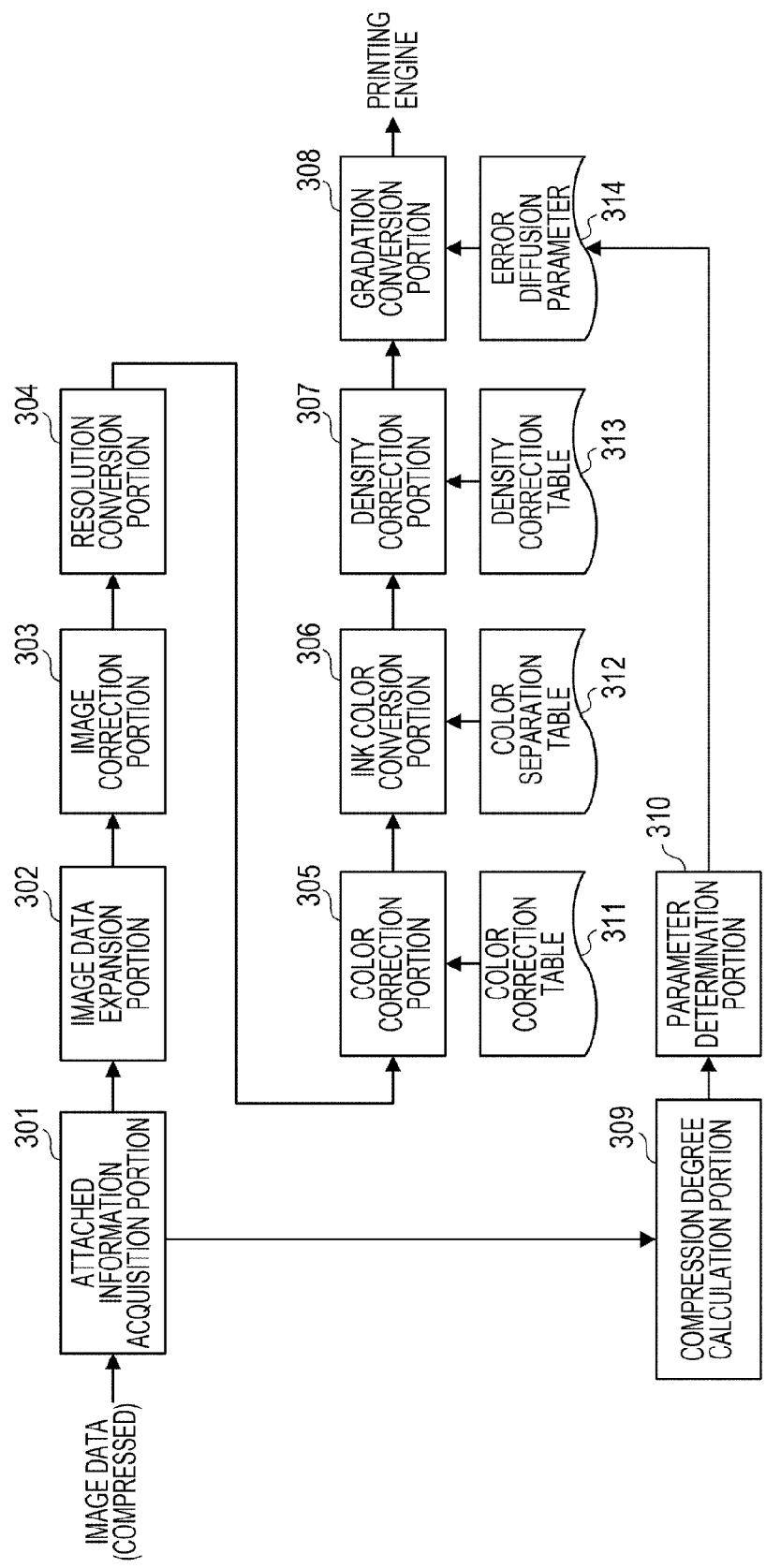
FIG. 3 illustrates an example of a block diagram of a firmware configuration according to an embodiment.

FIG. 3 illustrates an example of a block diagram of a firmware configuration according to an embodiment. Functions of the individual blocks illustrated in FIG. 3 are stored as program modules of the control program in the ROM 204, and the functions of the individual blocks in FIG. 3 are implemented when the CPU 202 executes these modules. A hardware circuit for performing part or all of these blocks may be provided separately. By allowing the hardware circuit to implement all the functions or to implement part of the functions and cooperate with the CPU 202, the functions explained with reference to FIG. 3 may be implemented.

Processing illustrated in FIG. 3 is performed on image data input to the input interface 201 to convert the image data into a recording signal of a resolution and the number of gradation levels that can be received by a printing engine, which is not illustrated, connected to the recording head, and the recording signal is output to the printing engine. Hereinafter, the details will be described.

Explanation of Individual Processing Portions

An attached information acquisition portion 301 acquires various parameters used when image data was compressed. These parameters include information for identifying the compression ratio of the image data. For example, in the case where a JPEG file of JPEG-compressed image data is input, the JPEG file contains a quantization table and image data size used when JPEG compression was performed. By using the above information, a quantization factor (Q factor) for identifying the number of quantization steps can be obtained. The attached information acquisition portion 301 acquires the quantization table (Q table) and the image data size (the number of vertical pixels and the number of horizontal pixels).

Furthermore, the various parameters acquired by the attached information acquisition portion 301 are transmitted to an image data expansion portion 302 to be used for processing for expanding the compressed image data. The various parameters are also transmitted to a compression degree calculation portion 309 to be used for processing for calculating the degree of compression at the time when the image data was compressed.

Figure 8:
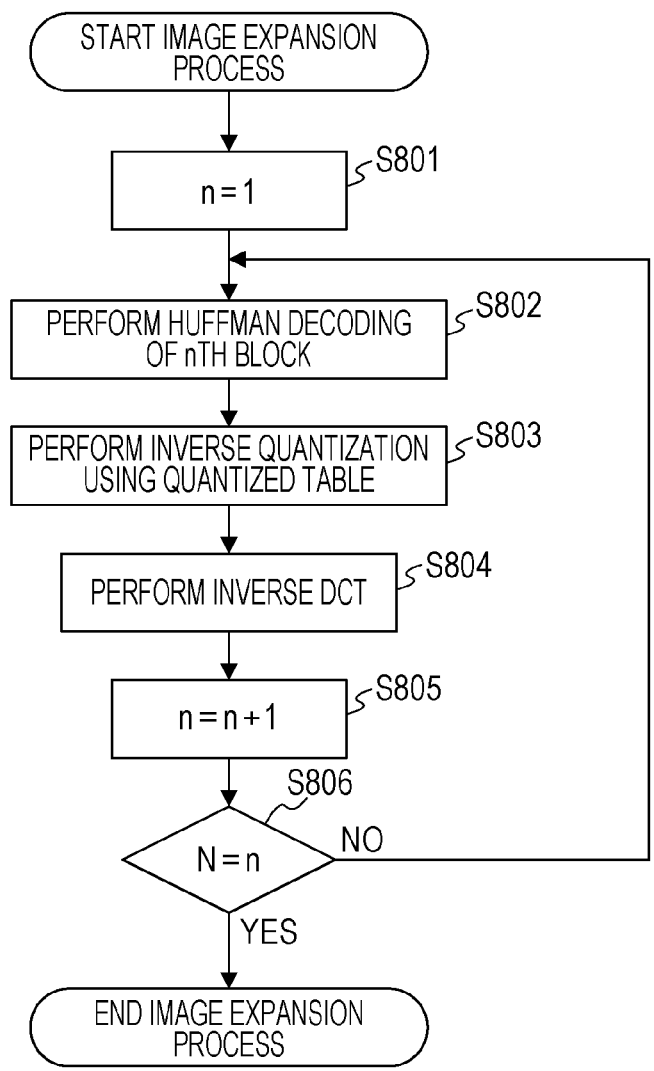
FIG. 8 is a flowchart of a decoding process for image data.

The image data expansion portion 302 is a processing portion which decodes the encoded image data to extract image data. In the case where the input image data is compressed, the image data expansion portion 302 performs expansion of the image data by performing expansion processing corresponding to the compression method of the image data. The processing performed by the image data expansion portion 302 will be described with reference to FIG. 8. FIG. 8 illustrates an example of the case where the compression method is a JPEG method.

FIG. 8 is a flowchart of a decoding process for image data. A program corresponding to the process illustrated in FIG. 8 is stored as a program module of the image data expansion portion 302 in the ROM 204, and the process illustrated in FIG. 8 is implemented when the CPU 202 executes the program.

An image in a JPEG data method is obtained by performing compression processing for each N square blocks each having 8 pixels. In FIG. 8, initialization is performed by setting a variable n representing a block as a target of expansion processing to 1 (S801).

Next, Huffman decoding is performed for the 8-pixel square block n to be processed (S802). Then, inverse quantization is performed using a quantization table acquired by the attached information acquisition portion 301 (S803). Then, inverse DCT is performed (S804).

Next, the variable n is incremented by one (S805), and a comparison between the incremented variable n and the number N of all blocks of the image (S806).

If the variable n is less than the number N of all blocks, it is determined that a block to be processed remains, and processing of S802 to S805 is repeated. The number N of all blocks may be obtained by dividing the number of vertical and horizontal pixels represented as the image data size acquired by the attached information acquisition portion 301 by 8 pixels.

Huffman encoding is a method for performing compression by reducing the number of the entire bits by allocating a short code of a small number of bits to data of a high appearance frequency. In the Huffman decoding in S802, decoding is performed using Huffman code corresponding to the Huffman encoding.

In the inverse quantization in S803, inverse quantization is performed using the quantization table which was used for compression and which is acquired by the attached information acquisition portion 301, and development to image data is performed.

The inverse DCT in S804 is processing for performing inverse transform for returning image data which has been divided into DC components and AC components by DCT to the original image density components. The JPEG compression may be performed in a method of a luminance Y and color differences Cb and Cr. In this case, data on which inverse DCT processing has been performed has a YCbCr form. Image signal values RGB are obtained in accordance with Equation 1.

$$R=(Y+128)+1.402(Cr-128)$$

$$G=(Y+128)-0.34414(Cb-128)-0.71414(Cr-128)$$

$$B=(Y+128)+1.772(Cb-128) \quad \text{Equation 1:}$$

The image signal values RGB obtained as described above by the image data expansion portion 302 are transmitted to an image correction portion 303.

The image correction portion 303 performs image correction of the RGB data. Image correction may include, for example, lightness adjustment for brightening or darkening the entire color, contrast adjustment, color balance adjustment, and backlight correction and red-eye correction in photography printing. By performing the above corrections for this block in a unitary manner, processing which does not depend on a recording apparatus can be achieved. The image on which correction has been performed as described above by the image correction portion 303 is transmitted to a resolution conversion portion 304.

The resolution conversion portion 304 converts an image into a resolution corresponding to a recording apparatus. A necessary scaling amount is derived from input image data and the resolution of the recording apparatus, and enlarging or reducing processing is performed. Scaling processing includes, for example, a nearest neighbor method, a bilinear method, and a bicubic method. The above processing is appropriately selected taking into consideration the characteristics of the processing, the processing speed, and a printing mode set in the corresponding printing. The image on which resolution conversion has been performed as described above is transmitted to a color correction portion 305.

The color correction portion 305 performs color conversion processing for output from a recording apparatus. For example, in the case where an image displayed on a display device is recorded, the color reproduction range is not always the same between display and printing. For example, a certain color has a narrower reproduction range for a recording apparatus, and a different color has a narrower reproduction range for a display device. There is a need to minimize such image degradation and perform color compression and expansion in an appropriate manner.

In this embodiment, the color correction portion 305 performs the above processing in an RGB method. That is, RGB values input to the block are converted into RGB values for the recording apparatus (hereinafter, for distinction, referred to as Device RGB) by taking the reproductivity of the device into consideration. Conversion may be performed through calculation of a matrix and the like. In this embodiment, however, a three-dimensional color correction table 311 is used.

In the case where RGB values each having 8 bits (256 gradation levels) are input, when all the combinations are maintained, the data volume of data representing the combinations is large. Therefore, the color correction table 311, in which thinning is performed at specific intervals, is used.

FIG. 4 illustrates an example of a color correction table.

In the example of FIG. 4, the color correction table describes Device RGB values corresponding to 17 grid points, which represent 256 gradation levels of each color (17·17·17=4913 grid points).

A value between grid points is calculated using interpolation processing. In this embodiment, a process using tetrahedral interpolation is described as an interpolation method. The tetrahedral interpolation method is linear interpolation in which a three-dimensional space is divided into units of tetrahedrons and four grid points are used.

Figure 5A:
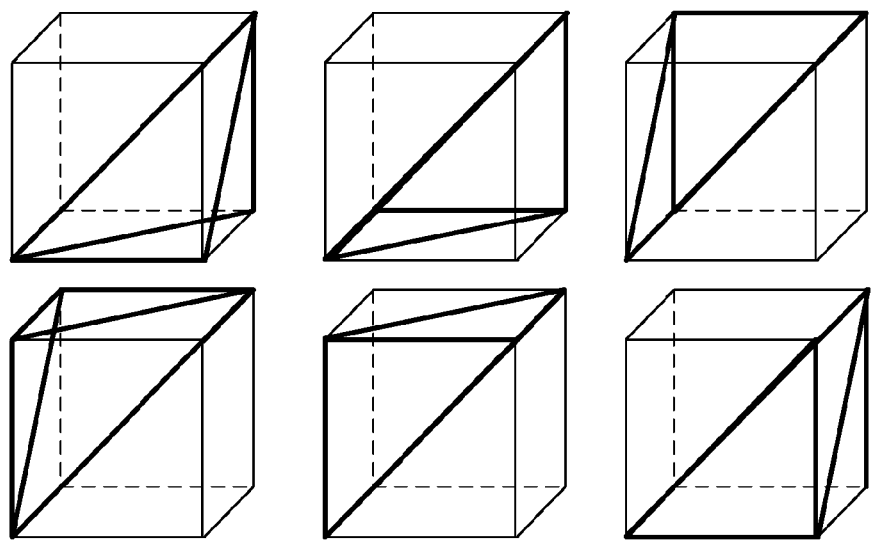
FIGS. 5A and 5B are diagrams for explaining a tetrahedral interpolation method.
Figure 5B:
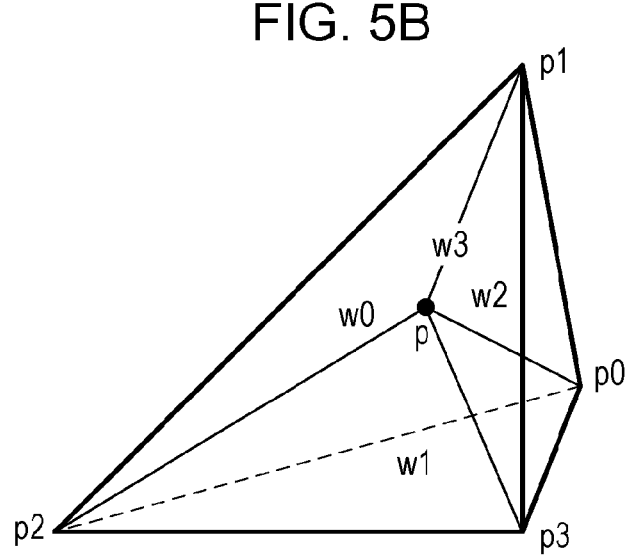

FIGS. 5A and 5B are diagrams for explaining a tetrahedral interpolation method. First, division into tetrahedrons is performed, using Equation 2, as illustrated in FIG. 5A. Then, it is determined to which one of the divided tetrahedrons a target point p belongs. The four vertices of the tetrahedron are represented by p0, p1, p2, and p3, and the tetrahedron is further divided into small tetrahedrons, as illustrated in FIG. 5B. In the case where conversion values of the individual points are represented by f(p0), f(p1), f(p2), and f(p3), an interpolation value f(p) is obtained using Equation 2.

$$f(p) = \sum_{i=0}^{3} wi \times f(pi) = [w0, w1, w2, w3] \begin{bmatrix} f(p0) \\ f(p1) \\ f(p2) \\ f(p3) \end{bmatrix}$$ Equation 2

In Equation 2, w0, w1, w2, and w3 represent the volume rate of small tetrahedrons at anti-counter positions with respect to the individual vertices pi to the entire tetrahedron p0p1p2p3. The Device RGB values corresponding to the target RGB values are calculated as described above. 8 bits or more may be output, in consideration of the gradation characteristics.

Furthermore, since the color correction table also depends on the color reproduction range of the recording apparatus as described above, for example, in the case where different types of recording paper are used for recording, tables corresponding to the types of recording paper may be prepared. After the color correction processing is performed for the image to be printed by the color correction portion 305 as described above, the color-corrected image is transmitted to an ink color conversion portion 306.

The ink color conversion portion 306 converts the Device RGB values determined by the color correction portion into ink colors CMYK. In the conversion, a color separation table 312 in which the values of ink colors corresponding to the combinations of the Device RGB are described in advance, is used. For this block, as with the color correction portion 305, a table of 17 grid points is used.

Figures 6, 7:
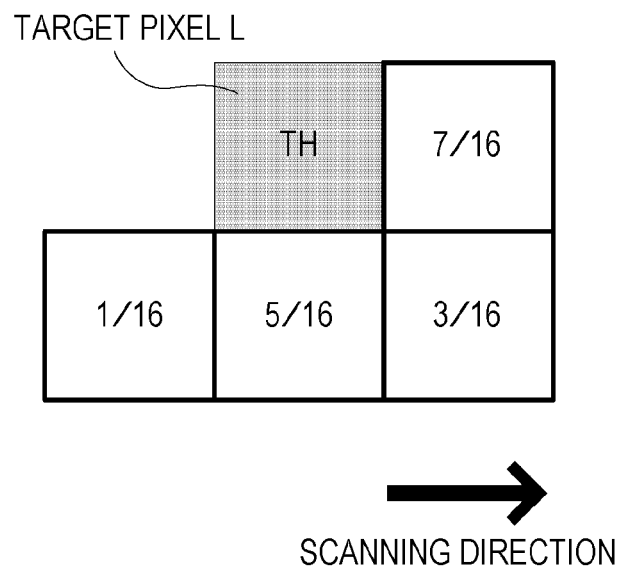
FIG. 6 illustrates an example of a color separation table.
FIG. 7 is a diagram illustrating an error distribution method in an error diffusion method.

FIG. 6 illustrates an example of the color separation table 312. In this embodiment, for example, values of four colors: cyan (C), magenta (M), yellow (Y), and black (K), corresponding to the individual grid points are described as ink colors. These values are determined taking into consideration that ink does not bleed on recording paper and ink bleeding does not occur when two pieces of ink are closed to each other. That is, in the case where different types of recording paper are used, color separation tables 312 corresponding to the different types of recording paper may be prepared.

As with the color correction portion described above, values obtained after ink separation corresponding to the target device RGB values may be obtained by using the tetrahedral interpolation processing described with reference to FIGS. 5A and 5B. After the image data is converted into CMYK data as described above, the converted data is transmitted to a density correction portion 307.

In the case of ink jet recording, as the amount of ink applied as dots on recording paper increases, overlapping of dots increases, and it becomes more difficult for the recording density to increase. Therefore, the density correction portion 307 corrects the density to achieve a uniform density responsiveness. With the density correction, the accuracy at the time of creation of the above-mentioned color correction table 311 and color separation table 312 can be easily ensured. Since the correction can be performed for each of C, M, Y, and K, a one-dimensional density correction table 313 is used here. A table corresponding to 8 bits (256 gradation levels) of input of individual colors can be prepared. Thinning is not particularly required, and the table only need to describe values corresponding to individual signal values. The data on which the density correction has been performed as described above is transmitted to a gradation conversion portion 308.

The gradation conversion portion 308 converts multi-bit data which has been subjected to ink color conversion and density correction into a recording signal, in accordance with the number of gradation levels that can be recorded by the recording apparatus. For an explanation of gradation conversion processing, a recording signal of two gradation levels (1 bit): record (1) and non-record (0), will be described below. As a gradation conversion method, an error diffusion method capable of eliminating a high-frequency component of an image and reproducing a visually suitable gradation level is used. In addition, for example, 0 to 255 (8 bits) will be explained as an input signal of multi-bit data.

FIG. 7 is a diagram illustrating an error distribution method in an error diffusion method. When the signal value of a target pixel is represented by L, the signal value L is compared with a threshold value TH. In order to represent 0 to 255 by binary data, a threshold value used here is set to 127. According to the comparison, a result described below is obtained.
L>TH (127) . . . 1 (record)
L≤TH (127) . . . 0 (non-record)

Then, in accordance with a determination result, a quantization representative value V is set as described below.
1 (record) . . . 255
0 (non-record) . . . 0

By setting the quantization representative value V as described above, an error E (=L−V) generated is distributed to pixels around the target pixel. More specifically, in accordance with the proportion of distribution factors illustrated in FIG. 7, the error is distributed to pixels positioned on the lower left, below, lower right, and right of the target pixel. In the case where a distribution target pixel exists only on the right of the target pixel, the error is directly added to the right pixel. Then, the pixel on the right of the target pixel turns to a new target pixel, a value La obtained by adding a distributed error Ea(Ex7/16) to the signal value L of the new target pixel is compared with a threshold value. Therefore, a determination result described below is obtained.
La>TH (127) . . . 1 (record)
La≤TH (127) . . . 0 (non-record)

Since the error Ea of the luminance value with respect to the quantization representative value V is within a range from −127 to +126, the value La to be compared with the threshold value is within a range from −127 to +381.

By performing the above processing for all the pixels in the lower right direction of the image for all the ink colors C, M, Y, and K, 1-bit ink color data (recording signal) that can be recorded can be obtained.

The thus generated ink color data is transmitted to the printing engine, and the printing engine determines, in accordance the ink color data, whether or not ink ejection is necessary. Then, when ink is ejected from the recording head 101 in accordance with a result of the determination, an image corresponding to the JPEG image data input to the input interface 201 is recorded onto the recording medium.

An example in which the gradation conversion portion 308 converts the number of gradation levels into "2" has been described above. However, in this embodiment, ink color data (recording signal) is generated based on the number of gradation levels corresponding to the degree of compression when the image data was compressed. More specifically, the compression degree calculation portion 309 calculates the degree of compression of the image data, and the parameter determination portion 310 determines the number of gradation levels corresponding to the degree of compression. The gradation conversion portion 308 performs gradation conversion so that the determined number of gradation levels can be obtained. Hereinafter, the details of a process performed by the compression degree calculation portion 309 and a parameter determination portion 310 will be explained.

The compression degree calculation portion 309 calculates the degree of compression on the basis of the quantization table that was used for compression and which is acquired by the attached information acquisition portion 301. More specifically, the similarity between the quantization table and each of quantization tables corresponding to compression Q factors illustrated in FIGS. 14A, 14B, and 14C recorded in advance. In each of the quantization tables recorded in advance, a Q factor representing the degree of compression is set. A method for determining a Q factor of a quantization table with a high similarity as the degree of compression, will be explained below.

FIGS. 14A, 14B, and 14C are diagrams illustrating examples of quantization tables stored in advance in the printing apparatus. In FIG. 14A, the Q factor is 50. In FIG. 10B, the Q factor is 75. In FIG. 14C, the Q factor is 90. These quantization tables are set in such a manner that as the Q factor increases, the degree of compression decreases (the compression ratio becomes lower), and degradation caused by compression and expansion decreases. These quantization tables are stored in the ROM 204.

The compression degree calculation portion 309 compares the quantization table of the JPEG data acquired by the attached information acquisition portion 301 with each of the quantization tables illustrated in FIGS. 14A, 14B, and 14C, and determines the similarity between them. As illustrated in FIGS. 14A to 14C, a JPEG quantization table holds 8×8 (=64) tables for luminance and color difference. As represented by Equation 3, the difference between the quantization table of the JPEG image to be printed and each of the plurality of quantization tables illustrated in FIGS. 14A to 14C, which are stored in advance in the ROM 204, is calculated.

$$R = \sum_{y=0}^{7}\sum_{x=0}^{7} \{Ya(x,y) - Yb(x,y)\} + \sum_{y=0}^{7}\sum_{x=0}^{7} \{Cba(x,y) - Cbb(x,y)\} + \sum_{y=0}^{7}\sum_{x=0}^{7} \{Cra(x,y) - Crb(x,y)\}$$

Equation 3

In Equation 3, Ya(x,y), Cba(x,y), and Cra(x,y) indicate quantization values of the luminance Y, the color difference Cb, and the color difference Cr of a quantization factor linked with a Q factor and held in advance at a coordinate position (x,y). In addition, Yb(x,y), Cbb(x,y), and Crb(x,y) indicate the luminance Y, the color difference Cb, and the color difference Cr obtained from target JPEG attached information at the coordinate position (x,y).

Then, the Q factor at the time when the JPEG data was compressed is determined on the basis of the similarities corresponding to the quantization tables illustrated in FIGS. 14A to 14C and the Q factors corresponding to the individual quantization tables. Accordingly, although the Q factors of the quantization tables illustrated in FIGS. 14A to 14C are discrete from one another, values of a wide range from less than 50 to more than 90 can be determined as a Q factor of the JPEG data to be printed.

The method for calculating the degree of compression is not limited to the above. The degree of compression may be calculated by weighting a quantization table. Weight is set as a similarity R for the difference between quantization tables, as in Equation 4. For example, a weight Wy for the difference in the luminance between quantization tables is set to be high, and weights Wcb and Wcr for the differences in the color differences between the quantization tables are set to be low. This is because regarding the difference in density of pixel data, luminance is visually more conspicuous than color difference. A method for giving priority to a smaller difference in luminance between the quantization tables may be employed.

$$R = \sum_{y=0}^{7}\sum_{x=0}^{7} \{Ya(x,y) - Yb(x,y)\} \times Wy + \sum_{y=0}^{7}\sum_{x=0}^{7} \{Cba(x,y) - Cbb(x,y)\} \times Wcb + \sum_{y=0}^{7}\sum_{x=0}^{7} \{Cra(x,y) - Crb(x,y)\} \times Wcr$$

Equation 4

For example, weighting may be performed in 64 quantization tables. In any case, various methods may be adopted as long as the degree of compression of image data can be expressed.

The smallest similarity R is selected, and the Q factor of the selected similarity R is defined as the degree of compression. Although Q factors are provided in three stages in this embodiment, a larger number of stages may be provided. Furthermore, more detailed Q factors may be set based on the value of the similarity R.

The degree of compression calculated as described above by the compression degree calculation portion 309 is transmitted to the parameter determination portion 310.

The parameter determination portion 310 determines a parameter on the basis of the degree of compression calculated by the compression degree calculation portion 309. More specifically, the parameter determination portion 310 determines the number of gradation levels to be used for gradation conversion by the gradation conversion portion 308. The details of the determination process will be described with reference to a flowchart of FIG. 13.

Figure 13:
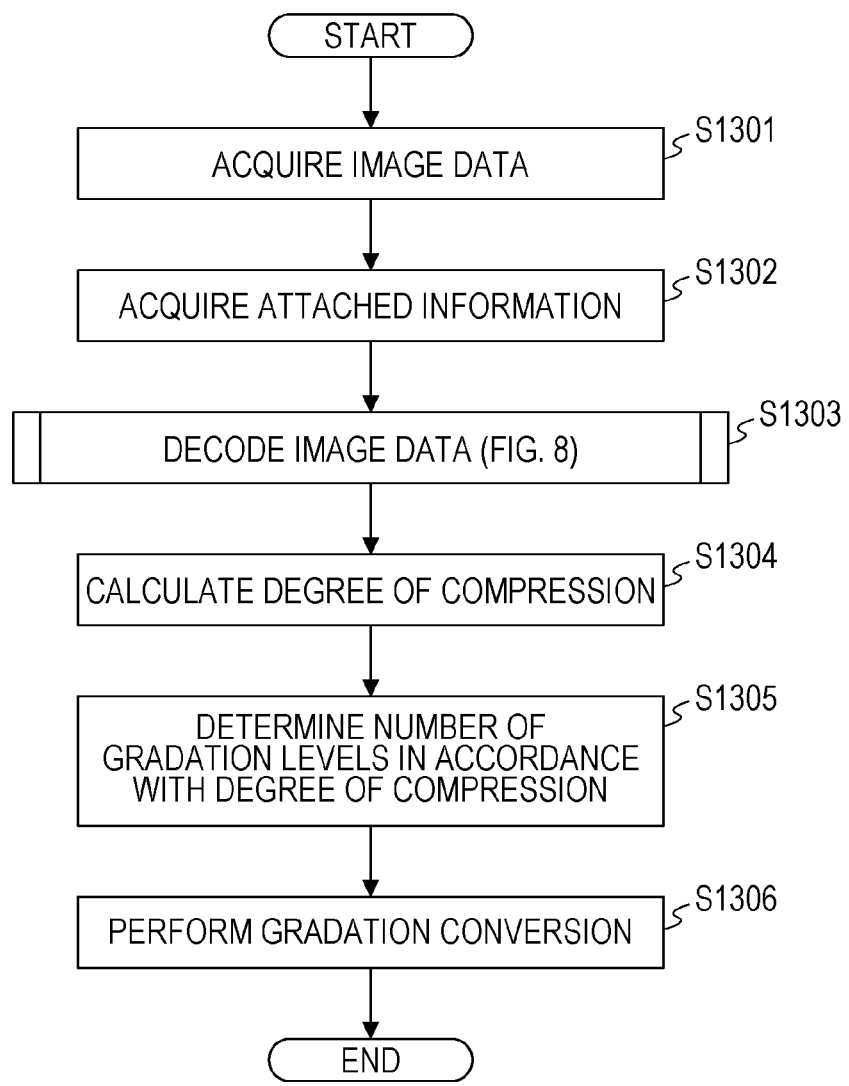
FIG. 13 is a flowchart illustrating an example of a gradation conversion process according to an embodiment.

FIG. 13 is a flowchart illustrating an example of a gradation conversion process according to an embodiment. A program corresponding to the process illustrated in FIG. 13 is stored as a program module of the image data expansion portion 302 in the ROM 204, and the process illustrated in FIG. 13 is implemented when the CPU 202 executes the program.

In S1301, the attached information acquisition portion 301 acquires compressed image data and information regarding compression as attached information of the image data. In this embodiment, JPEG-encoded image data is acquired.

In S1302, the attached information acquisition portion 301 acquires the attached information from the image data acquired in S1301, and acquires a Q table, which is a compression parameter.

Next, in S1303, the image data expansion portion 302 performs expansion processing for the compressed image data by performing the decoding process described above and illustrated in FIG. 8 by using the image data and the Q table acquired in S1302.

Next, in S1304, the compression degree calculation portion 309 determines the similarity between the Q table acquired in S1302 and each of the plurality of Q tables stored in the ROM 204 illustrated in FIGS. 14A to 14C, as explained with reference to FIGS. 14A to 14C and Equations 3 and 4. Then, the degree of compression is obtained by identifying the degree of compression (Q factor) corresponding to a Q table with a high similarity.

Next, in S1305, the parameter determination portion 310 determines the number of gradation levels in accordance with the degree of compression calculated in S1304. In the processing of S1305, the number of gradation levels corresponding to the degree of compression is determined by referring to a table indicating the correspondence between a Q factor and the number of gradation levels, which will be described later with reference to FIG. 12.

Next, in S1306, the gradation conversion portion 308 performs gradation conversion in accordance with the number of gradation levels set in S1305. Although explanation is omitted here, before the gradation conversion in S1306, the above-mentioned image correction, resolution conversion, color correction, and density correction by the image correction portion 303, the resolution conversion portion 304, the color correction portion 305, the ink color conversion portion 306, and the density correction portion 307 are performed. The density correction may be performed after gradation conversion.

After the processing of S1306 is performed, the image on which gradation conversion has been performed is output to the printing engine.

Next, the number of gradation levels determined in S1305 corresponding to the degree of compression will be explained.

In this embodiment, the number of gradation levels is calculated based on the degree of compression calculated from a Q table of attached information. At this time, when the degree of compression is large and image degradation may be large, the number of gradation levels is set to be smaller than the case where the degree of compression is small.

In this embodiment, the degree of compression calculated by the compression degree calculation portion 309 is acquired. Then, the parameter determination portion 310 determines the number of gradation levels to be obtained after gradation conversion. In the determination of the number of gradation levels, multiple numbers of gradation levels corresponding to degrees of compression are prepared, and the number of gradation levels corresponding to the degree of compression acquired by the attached information acquisition portion 301 is selected.

The number of gradation levels corresponding to the degree of compression is set in advance in accordance with the number of occurrences of mosquito noise occurring when an image is encoded and decoded. An explanation of processing for determining the number of gradation levels to be obtained after gradation conversion will be provided in the order provided below. First, a method for calculating the number of occurrences of mosquito noise will be explained. Then, a method for determining the number of gradation levels on the basis of the number of occurrences of mosquito noise will be explained. Finally, a method for determining the number of gradation levels on the basis of the degree of compression will be explained.

The above-mentioned processing may be performed under the control of the CPU 202 in the printing apparatus illustrated in FIGS. 1 to 3. Alternatively, the processing may be performed by various computers different from the printing apparatus and a result of the processing may be stored, for example, in the ROM 204. The result of the processing mentioned above is a table indicating the number of gradation levels corresponding to the degree of compression. The details of the table will be described later.

Figure 9:
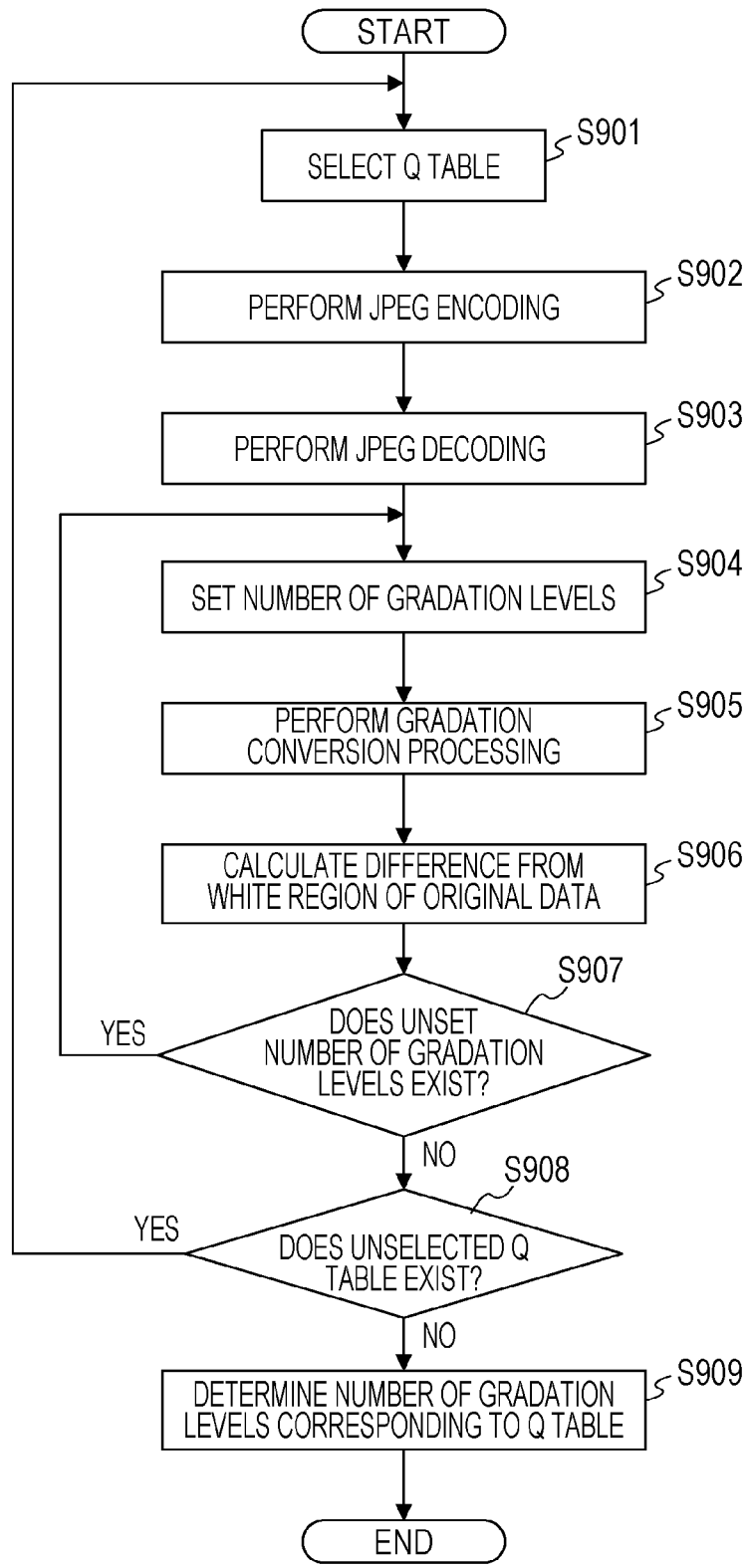
FIG. 9 is a flowchart illustrating a process for calculating the number of occurrences of mosquito noise.

FIG. 9 is a flowchart illustrating a process for calculating the number of occurrences of mosquito noise. In the example of FIG. 9, the number of pixels of mosquito noise occurring against character data is calculated. Since a user recognizes the details of a character on the basis of the position, the length, the angle, and the like of edges of the character, the influence of mosquito noise on characters is greater than on photographs and the like. Therefore, in the process illustrated in FIG. 9, mosquito noise is calculated from character data as a sample. More specifically, as sample data, character image data obtained by converting arbitrary character data into anti-aliased RGB image data is used.

In S901, a Q table for performing inverse quantization prepared on a printer side to be used for JPEG decoding processing is selected. For example, three Q tables, Qa, Qb, and Qc are prepared in advance. In S901, one of the three Q tables is selected.

Next, in S902, JPEG encoding processing is performed for character image data prepared in advance, by using the Q table selected in S901. More specifically, color space conversion processing is performed for image data in an RGB format to obtain data in a YCbCr format. The color space conversion processing is processing for converting values of three primary colors of light: red (R), green (G), and blue (B), into three components of luminance Y and color difference (blue Cb and red Cr). Color space conversion is performed using Equation 5.

$$Y = 0.299R + 0.587G + 0.114B - 128$$

$$Cb = -0.1687R - 0.3313G + 0.5B + 128$$

$$Cr = 0.5R - 0.4187G - 0.0813B + 128 \qquad \text{Equations 5:}$$

Next, sampling processing is performed for data in the YCbCr format. In the sampling processing, 8×8 pixels are defined as one block. In 2 blocks (vertical)×2 blocks (horizontal) (=4 blocks), color difference information, out of luminance information and color difference information, is thinned out.

For example, data is thinned out at the rate of Y:Cb:Cr=4: 1:1. In this case, the color differences Cb and Cr are thinned out every other pixel vertically and horizontally.

Next, the image is divided into units of blocks, and conversion into a spatial frequency component is performed for each block. Conversion into a spatial frequency component is processing for performing conversion into a spatial frequency for each block, dividing the spatial frequency into a DC component and an AC component, omitting an error by quantization, and reducing the size of the image.

For example, in the case of JPEG, DCT is performed.

Next, quantization processing is performed for data converted into a spatial frequency component. In the quantization processing, small errors are omitted by performing division by an integer to round off a fraction, using the Q table selected in S901. A larger number of quantization steps is set for low-frequency components than that for high-frequency components. Low-frequency components in an image are more likely to be recognized than high-frequency components. Therefore, by performing quantization so that high-frequency components are more eliminated as described above, the amount of data can be reduced so that image degradation is made inconspicuous.

Then, encoding processing is performed for the quantized data. In JPEG encoding processing, using Huffman encoding, processing for reducing the number of the entire bits by allocating a short code with a small number of bits to data with a high appearance frequency is performed.

As described above, JPEG encoding processing is performed for character image data prepared in advance, by using the Q table selected in S901.

Next, in S903, processing for decoding the image data encoded using the Q table selected in S901 is performed. In the decoding processing, processing opposite the encoding processing is performed. More specifically, in order to perform decoding for the JPEG encoded data, Huffman code is decoded. Next, inverse quantization processing is performed by using the Q table selected when the encoding processing was performed. Next, inverse DCT is performed for data for each of the inversely quantized blocks, and conversion into data in the YCbCr format is performed. Then, in the color space conversion processing represented by Equation 1, data in the YCbCr format is converted into RGB data.

As described above, decoding processing is performed for data obtained by performing JPEG encoding processing for character image data prepared in advance, by using the selected Q table, and the data is converted into an image data format before encoding is performed. As described above, encoding and decoding in the JPEG format are performed, and character image data which is more degraded than the original image is generated.

In S904, a predetermined number of gradation levels is set for the character image data which has been JPEG decoded in S903. One of multiple numbers of gradation levels is set so as to correspond to the printing engine. For example, in the case where the printing engine is capable of recording using a method of two steps corresponding to the density, the number of gradation levels corresponding to the printing engine is set to "2" and "3". More specifically, in the case where the printing engine is capable of ejecting two dots or one dot of ink for a pixel, the number of gradation levels "3" can be set: "0 (ink is not ejected)", "1 (one dot of ink is ejected)", and "2 (two dots of ink are ejected)". Alternatively, the number of gradation levels "2" can be set: "0 (ink is not ejected)", "1 (one dot or two dots of ink are ejected)".

In the above example, in S904, the number of gradation levels "2" or "3" is selected.

In S905, processing equivalent to the image correction portion 303, the resolution conversion portion 304, the color correction portion 305, the ink color conversion portion 306, the density correction portion 307, and the gradation conversion portion 308 is performed, and image processing for generating printing data is performed.

In the processing equivalent to gradation conversion by the gradation conversion portion 308 performed as described above, a threshold value for determining a gradation is set in advance for each number of gradation levels. For example, in the case where the pixel value of multi-valued data is 0 to 255, the threshold value for each gradation is set to 127 when the number of gradation levels is 2, and the threshold value for each gradation is set to 64 and 192 when the number of gradation levels is 3.

The gradation conversion portion 308 performs gradation conversion for the data which has been subjected to JPEG encoding and decoding and various types of image processing, in accordance with a threshold value for each gradation. In the gradation conversion, gradation conversion is performed for converting the value La obtained by adding peripheral error to input data of 0 to 255 into a numerical value, such as 0, 1 or 0, 1, 2, in accordance with a predetermined threshold value. For example, the cases where the number of gradation levels is 2 and 3 will be explained below.

When the number of gradation levels is 2, in order to convert multi-valued data of 0 to 255 into binary data, the threshold value TH is set to 127. A comparison with a threshold value TH is performed for each pixel, and gradation conversion into a value of 0, 1 is performed, as described below.

La>TH (127) . . . 1 (record)
La≤TH (127) . . . 0 (non-record)

When the number of gradation levels is 3, in order to convert multi-valued data of 0 to 255 into ternary data, a threshold value THA is set to 64 and a threshold value THB is set to 192. A comparison with the threshold values THA and THB is performed for each pixel, and gradation conversion into a value of 0, 1, or 2 is performed, as described below.

La>THB (192) . . . 2 (record)
THB (192)≥La>THA (64) . . . 1 (record)
La≤THA (64) . . . 0 (non-record)

As described above, gradation conversion processing is performed for the data which has been subjected to JPEG encoding and decoding and various types of image processing, in accordance with the set number of gradation levels. In the case where the number of gradation levels is "3" as described above, since the error Ea of the luminance value with respect to the quantization representative value V is within a range from −64 to +62, the value La to be compared with the threshold value is within a range from −64 to +317.

In this embodiment, since error diffusion explained with reference to FIG. 7 is assumed to be performed as half tone processing, when the number of gradation levels is "3", the threshold values are set to 64 and 192. However, for example, in the case where the half tone processing is dither conversion, 85 and 170, which are values obtained by dividing the number of gradation levels 0 to 255 of multi-valued data into three, may be set as threshold values.

In S906, with respect to a white region of character image data input in S901 before JPEG encoding and decoding and gradation conversion, a difference from image data obtained after gradation conversion, which is output in S905, is calculated.

More specifically, for each pixel in a white region of the original character image data, the number of pixels for which a result of the gradation conversion is a recording region other than 0, is calculated. That is, the number of pixels which originally represents white (luminance value: 255) data, in which noise has occurred due to JPEG compression and expansion, and for which it is determined that ink ejection has become required by gradation conversion. For example, with respect to a white region, the number of pixels that are determined to be 1 (record) is calculated in the case where the number of gradation levels is 2, and the number of pixels that are determined to be 2 (record) and 1 (record) is calculated in the case where the number of gradation levels is 3.

It can be determined that as the number of pixels calculated as described above (pixels that become targets for ink ejection by the processing of S902 to S905) increases, the influence of mosquito noise on a processing result in the Q table selected in S901 increases.

In S907, it is determined whether or not there is the number of gradation levels to be set in S904. In the case where there is a remaining Q table, the process returns to S904. In S904, the unset number of gradation levels is set, and processing of S905 and S906 is performed using the Q table.

In S907, when it is determined that processing of S902 to S906 has been performed for all the numbers of gradation levels that can be set for the printing engine, the process proceeds to S908.

In S908, it is determined whether or not there is a Q table to be selected in S901. In the case where there is a remaining Q table, the process returns to S901. In S901, the unset Q table is selected, JPEG encoding and decoding in S902 and S903 are performed using the Q table, and processing of S904 to S906 is performed.

By performing the processing of S901 to S908 described above, the number of pixels which are originally white pixels and for which it is determined that ink ejection has become required by the JPEG encoding and decoding and the gradation conversion, is calculated, for each of all the combinations of Q tables and the numbers of gradation levels.

Then, in S909, in accordance with the tendency of the number of pixels calculated based on the combinations of Q tables and the numbers of gradation levels, the number of gradation levels corresponding to the degree of compression is determined. More specifically, a smaller number of gradation levels is determined for a Q table with a relatively high degree of compression, and a larger number of gradation levels is determined for a Q table with a relatively low degree of compression.

Then, the table indicating the number of gradation levels corresponding to the Q table determined in S909 is stored in the ROM 204. Then, when lossy-compressed image data to be printed is input into the input interface 201, in S1305 illustrated in FIG. 13, the number of gradation levels corresponding to the Q table acquired in S1302 is acquired from the table. Then, the number of gradation levels is determined as the number of gradation levels to be obtained after gradation conversion.

The processing for determining the number of gradation levels in S909 will be explained in detail with reference to FIG. 10 and FIGS. 11A to 11C.

FIG. 10 illustrates an example of the number of pixels calculated in S906, which corresponds to a combination of a Q table and the number of gradation levels.

FIG. 10 illustrates Q tables Qa, Qb, and Qc in increasing order of the degree of compression (the Q factor representing the degree of compression is decreasing and the degree of image degradation is increasing). The Q table Qa has a small degree of compression and the degree of image degradation is small. Therefore, the number of the above-mentioned pixels is smaller than Qb and Qc.

The number of gradation levels illustrated in FIG. 10 represents the number of gradation levels of gradation conversion processing of the printing engine. As is clear from FIG. 10, there is a tendency that the larger the number of gradation levels, the larger the number of the above-mentioned pixels. The reason for this tendency will be described with reference to FIGS. 11A, 11B, and 11C.

Figure 11A:
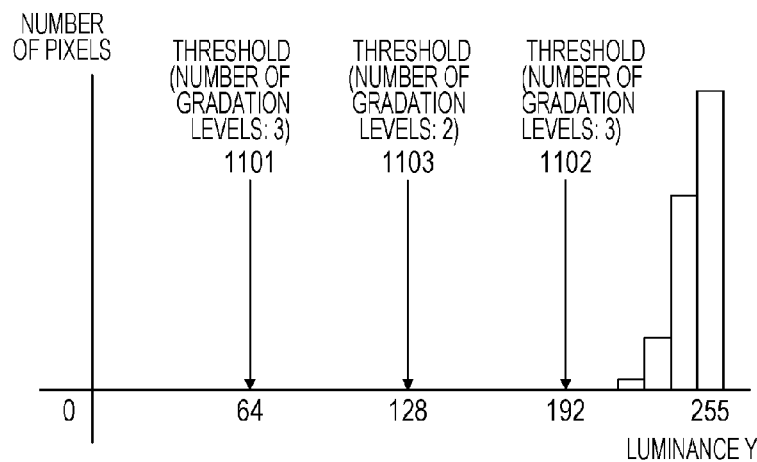
FIGS. 11A, 11B, and 11C illustrate histograms of a luminance after JPEG compression and expansion are performed for a white region of the original image.
Figure 11B:
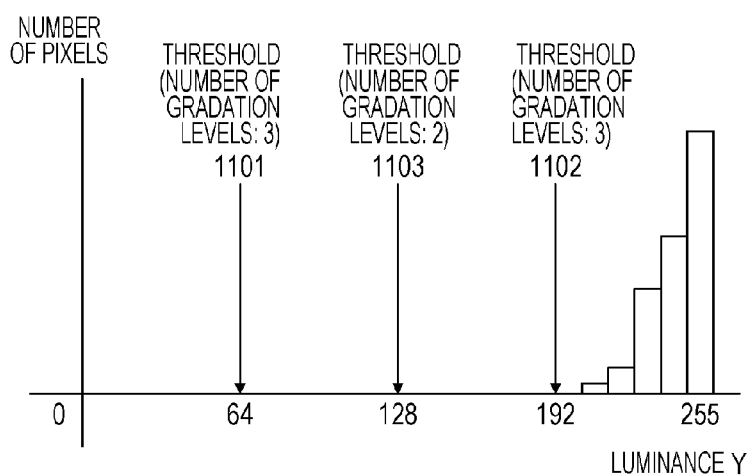
Figure 11C:
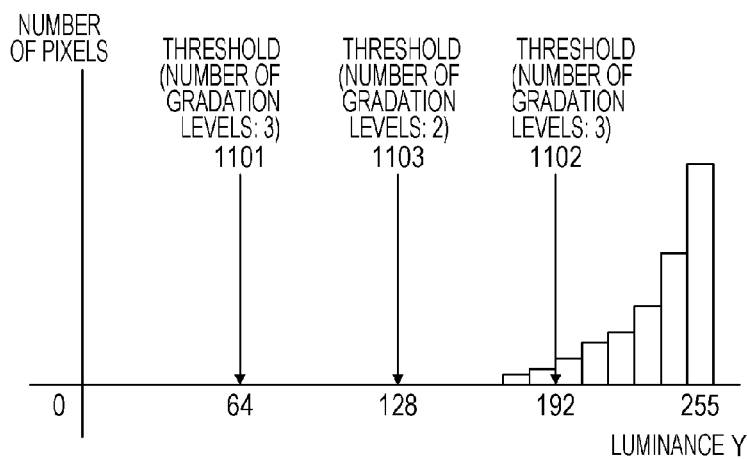

FIGS. 11A, 11B, and 11C illustrate histograms of the luminance Y obtained after JPEG compression and expansion are performed for a white region of the original image. In each of the histograms illustrated in FIGS. 11A to 11C, the horizontal axis represents a luminance value, and the vertical axis represents the number of pixels having the corresponding luminance value. FIGS. 11A, 11B, and 11C illustrates histograms of the Q tables Qa, Qb, and Qc, respectively. A target white region is common among the three histograms, and the total number of pixels is the same among the three histograms.

For example, in the case where image data of a white region is not compressed or lossless compression and expansion are performed, all the pixels to be processed have the original luminance value (255). Therefore, in the case where the histograms illustrated in FIGS. 11A to 11C are created, only the number of the rightest pixels of the histograms with the luminance value of 255 is counted, and the number of pixels with the other luminance values is "0".

In contrast, in FIGS. 11A to 11C, since JPEG compression and expansion are performed in the lossy compression method, the number of pixels is counted as gray pixels having a luminance value lower than 255. Furthermore, as the degree of compression increases (in the order of Qa, Qb, and Qc), image degradation increases, and the number of the pixels therefore increases by JPEG encoding and decoding. In addition, as the degree of compression increases, a pixel value becomes closer to black (luminance value: 0), that is, mosquito noise becomes conspicuous in multi-valued data.

Furthermore, a threshold value 1101 is set to 64 and a threshold value 1102 is set to 192 when the number of gradation levels is "3, and a threshold value 1103 is set to 128 when the number of gradation levels is "2". In this case, after gradation conversion is performed, the luminance value Y that is not determined to be white (a luminance value at which ink is ejected) is 0 to 192 when the number of gradation levels is "3", and 0 to 128 when the number of gradation levels is "2". That is, as is clear from the above, in the case where the number of gradation levels is "3", when a pixel which originally represents white becomes mosquito noise due to JPEG compression and expansion, it is more likely that ink ejection occurs due to gradation conversion.

Furthermore, when the error diffusion method explained with reference to FIG. 7 is used as half tone processing, an error for a different pixel is added to the luminance value of a certain pixel. Accordingly, for example, even if the luminance value of the certain pixel itself is determined to be "0 (ink is not ejected)" by gradation conversion, the luminance value to which the error has been added may be determined to be "1 (ink is ejected)". For example, in the case of the Q table Qa, as illustrated in FIG. 11A, the luminance values of all the pixels are included within the range from 193 to 255. However, due to the influence of the above-mentioned error, in the case where the number of gradation levels is 3 for the Q table Qa in FIG. 10, five pixels are determined, due to gradation conversion, to be "1 (ink is ejected)".

In particular, in the case where a black character is to be printed, pixels around edge portions of the character may be gray in multi-valued data. In this case, when the pixel of gray becomes binary or ternary by gradation conversion, error becomes larger, and the large error is added to white pixels around the gray pixel. Accordingly, as a result of gradation conversion, mosquito noise is likely to occur around the character.

That is, as is clear from FIGS. 11A to 11C, as the Q factor indicating the degree of compression decreases (as the degree of compression increases), the luminance value of the originally white data becomes smaller due to JPEG compression and expansion, and the data is likely to be determined to be "1 (ink is ejected)" due to gradation conversion. Furthermore, even if the luminance value decreases and gradation conversion provides a determination result of "0 (ink is not ejected)", the difference affects a different pixel, and the affected pixel is likely to be determined to be "1 (ink is ejected)". That is, it is clear from the above that as the Q factor decreases, mosquito noise is more likely to affect a printing result.

That is, it is clear from the above that as the number of gradation levels increases, a luminance value as a reference for obtaining a determination result of "1 (ink is ejected)" increases, and mosquito noise is therefore more likely to affect a printing result.

Consequently, as illustrated in FIG. 10, as the Q factor indicating the degree of compression decreases (as the degree of compression increases) and as the number of gradation levels increases, the number of pixels to which ink is ejected increases, and as a result, mosquito noise becomes more likely to affect a printing result.

In S909 illustrated in FIG. 9, the number of gradation levels corresponding to the Q table is determined in accordance with the tendency of the number of pixels to which ink is ejected with respect to a combination of a Q table and the number of gradation levels illustrated in FIG. 10. As described above, for a certain range of degree of compression, a smaller number of gradation levels reduces the influence of mosquito noise on a printing result. However, reducing the number of gradation levels may enhance the difference between adjoining pixels and may cause jaggies.

For example, in the case of character data, a larger number of gradation levels exhibits high gradation characteristics and thus smoothly expresses oblique lines and the like. For example, anti-aliased character data contains gray pixels to smoothly express oblique lines, as well as black and white pixels. It is desirable to set high gradation characteristics if possible in order to reproduce gray pixels.

Thus, in S909, on the condition that the number of pieces of mosquito noise against sample character data is 100 or less, the number of gradation levels is set as large as possible. In the example of FIG. 10, the number of gradation levels is set to 3 for the Q table Qa, 3 for the Q table Qb, and 2 for the Q table Qc.

In S909, based on the number of gradation levels determined for the Q tables Qa, Qb, and Qc as samples as described above, the number of gradation levels is determined for a range of the Q factor indicating the degree of compression.

In the case where the Q factor indicating the degree of compression is less than a predetermined threshold value based on the Q table Qc (for example, 50) (in the case where the degree of compression is more than a predetermined threshold), image degradation is large, and there is a tendency that a larger number of gradation levels increases the influence of mosquito noise on a printing result. In this case, by setting a small number of gradation levels "2", which is determined for the Q table Qc as described above, a printing result with a reduced influence of mosquito noise on a printing result can be obtained.

Furthermore, in the case where the Q factor indicating the degree of compression is equal to or more than a predetermined value based on the Q table Qa (for example, 80) (in the case where the degree of compression is less than or equal to a predetermined threshold), image degradation is relatively small, and there is a tendency that even if the number of gradation levels is large, the influence of mosquito noise on a printing result is relatively small. Therefore, in this case, reducing jaggies can be prioritized over reducing mosquito noise. By setting a relatively large number of gradation levels "3", which is determined for the Q table Qa as described above, a printing result with reduced jaggies can be obtained.

Similarly, in the case where the Q factor indicating the degree of compression is within a predetermined range based on the Q table Qb (for example, equal to or more than 50 and less than 80) (in the case where the degree of compression falls within a predetermined range), a relatively large number of gradation levels "3" determined for the Q table Qb as described above is set.

The number of gradation levels corresponding to the degree of compression, which is determined as described above in S909, will be explained with reference to FIG. 12. FIG. 12 illustrates an example of a table illustrating the number of gradation levels corresponding to a Q factor representing the degree of compression. In FIG. 12, the "degree of compression" indicates the Q factor. As the Q factor increases, the degree of compression decreases and image degradation at the time of expansion decreases. In contrast, as the Q factor decreases, the degree of compression increases, and image degradation at the time of expansion increases. In FIG. 12, a Q factor is associated with a Q table, and the number of gradation levels is associated with a Q table.

A table 1200 illustrated in FIG. 12 representing the correspondence between a Q factor and the number of gradation levels is stored in the ROM 204. In S1304 illustrated in FIG. 13, the parameter determination portion 310 determines the number of gradation levels corresponding to the degree of compression by referring to the table illustrated in FIG. 12 stored in the ROM 204.

In FIG. 12, association with the number of gradation levels is made in accordance with the type of a printing medium and the quality of printing (standard, high quality) in printing settings. The number of gradation levels determined in S909 as described above is adopted as the number of gradation levels in the case where the type of paper is normal paper and the quality of printing is standard.

In contrast, in the case where the quality of printing is "high quality", it can be determined that a user desires a higher color reproductivity than the case where the quality of printing is set to "standard". Therefore, a larger number of gradation levels than the number of gradation levels determined in S909 is set. The number of gradation levels for the case where the quality of printing is "high quality" may be determined on the basis of the number of gradation levels determined in S909 or may be set to, for example, the maximum number of gradation levels (for example, the number of gradation levels "4") with which the printing engine can be perform printing.

In this case, in S1305 illustrated in FIG. 13, the parameter determination portion determines the number of gradation levels to be obtained after gradation conversion, by calculating the table 1200 based on the quality of printing in the printing settings as well as the degree of compression calculated in S1304.

For example, in the case where the Q factor indicating the degree of compression is determined to be 90 and the type of printing paper and the quality of printing in printing settings are "normal paper" and "standard", respectively, the number of gradation levels is set to "3". In the case where the Q factor indicating the degree of compression is determined to be 40 and the type of printing paper and the quality of printing in printing settings are "normal paper" and "high quality", respectively, the number of gradation levels is set to "3". As described above, the number of gradation levels is set in advance in accordance with a combination of the printing settings including the type of printing paper and the quality of printing and the degree of compression.

Although explanation is omitted for the table 1200 illustrated in FIG. 12, the number of gradation levels for photographic paper, which is mainly used for photographic printing for the case where the type of printing paper is "glossy paper" or the like, is also set in the table. In the case of photographic paper, natural image is often printed compared to character data. Mosquito noise in natural images is inconspicuous and it is often desirable for natural images to have less jaggies than character data. Therefore, a table may be created so that the number of gradation levels for the case where the type of printing paper is photographic paper, such as "glossy paper", is larger than that for normal paper.

As described above, the table 1200 illustrated in FIG. 12 is created by the process illustrated in FIG. 9, and the table 1200 is stored in the ROM 204. Then, in the gradation conversion at the time of printing, the table is referred to. The process illustrated in FIG. 9 may be performed under the control of the CPU 202 in the printing apparatus. Alternatively, the process may be performed by various computers different from the printing apparatus and a result of the process may be stored in the ROM 204.

In the case where the process illustrated in FIG. 9 is performed by the printing apparatus, tables illustrated in FIGS. 14A to 14C may be used in the JPEG encoding (S902) and the JPEG decoding (S903) in FIG. 9. Accordingly, Q tables can be shared between the process for determining the number of gradation levels corresponding to the degree of compression (FIG. 9) and the process for determining the degree of compression of the image to be printed (S1304). Thus, compared to the case where Q tables used for individual processes are stored in the ROM 204, the number of Q tables stored in the ROM 204 can be reduced.

By the processing described above, gradation conversion can be performed for the image in accordance with the number of gradation levels corresponding to the degree of compression of a lossy-compressed image to be printed. For example, when the Q factor falls within a certain range, the number of gradation levels for the case where the Q factor is low (the case where the degree of compression is high and image degradation is likely to occur) is set to be smaller than the number of gradation levels for the case where the Q factor is high (the degree of compression is low and image degradation is less likely to occur).

With the settings described above, by reducing the number of gradation levels for an image in which mosquito noise is likely to occur and the noise greatly affects a printing result, the influence of the mosquito noise on the printing result can be reduced. In contrast, by increasing the number of gradation levels for an image in which the influence of mosquito noise on a printing result is relatively small, a printing result with gradation characteristics can be provided.

In the examples illustrated in FIG. 10 and FIGS. 11A to 11C, mosquito noise appears as light gray in multi-valued data. Therefore, for example, by setting the number of gradation levels "2", the value obtained after gradation conversion can be set to "0 (ink is not ejected)".

However, for example, in the case where the degree of compression is greater than those illustrated in FIGS. 11A to 11C, image degradation increases, and the color of noise in multi-valued data may become thicker. That is, noise of thick gray which is less than the median 128 in FIGS. 11A to 11C may occur. In this case, for example, even if the number of gradation levels is reduced to "2", the value of the pixel obtained after gradation conversion is not "0 (ink is not ejected)".

Furthermore, for example, in the case where the number of gradation levels is 3, the printing engine may eject ink with "1 (one dot of ink is ejected)" or "2 (two dots of ink are ejected)". And, in the case where the number of gradation levels is 2, ink may be ejected with "1 (two dots of ink are ejected)". In this case, when the number of gradation levels is 3, noise of thick gray (luminance value: 65 to 128) is recorded with one dot. Meanwhile, when the number of gradation levels is 2, the noise of thick gray is recorded with two dots. That is, if the number of gradation levels is reduced in the case where the Q factor is very small and image degradation is very large, noise may be rather conspicuous in a printing result.

In this embodiment, when it is determined that the degree of compression is very large, the number of gradation levels is set to be larger than the case of a smaller degree of compression (the degree of compression with less image degradation). Hereinafter, the details will be described.

Figure 15:
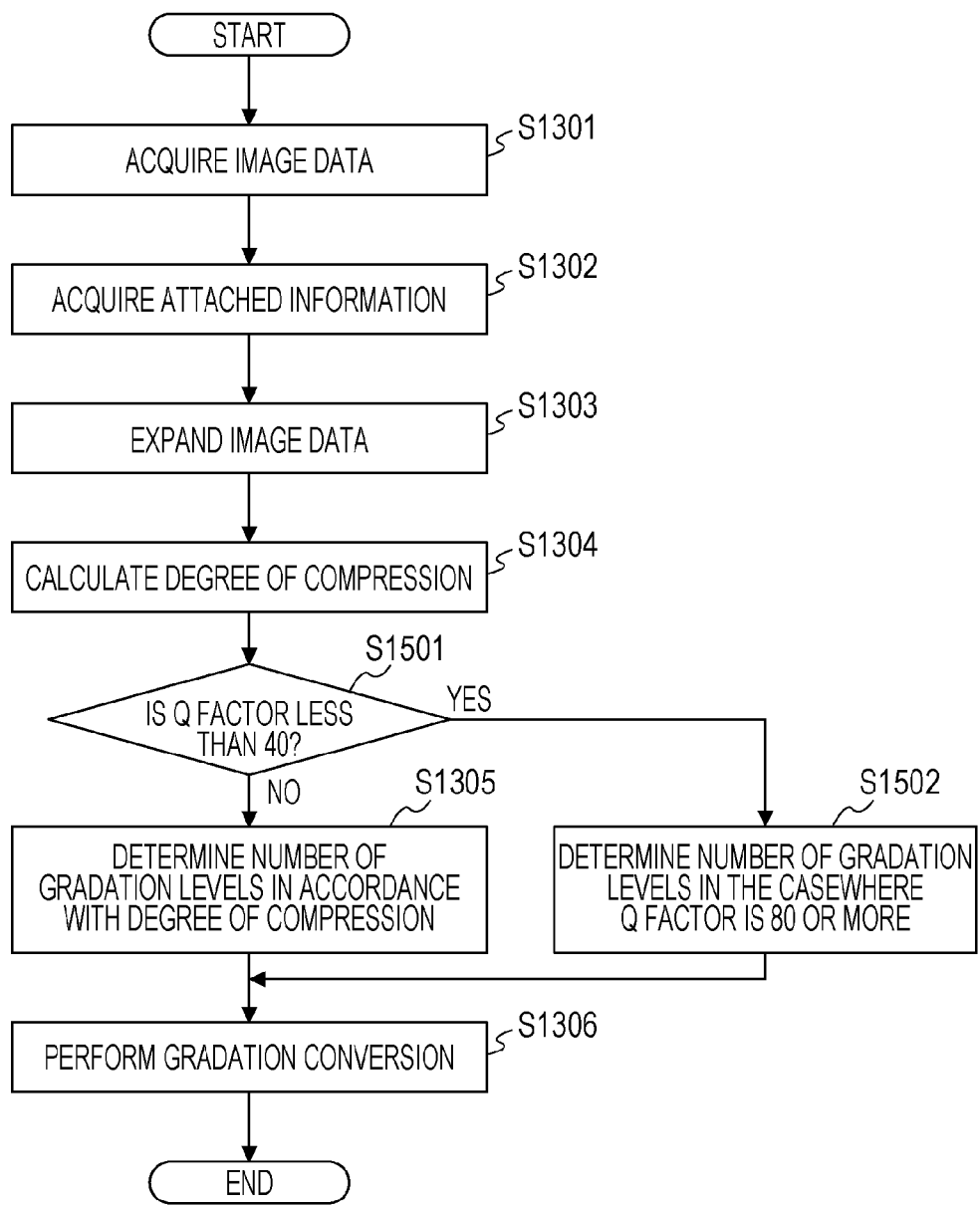
FIG. 15 is a flowchart illustrating an example of a gradation conversion process according to an embodiment.

FIG. 15 is a flowchart illustrating an example of a gradation conversion process according to an embodiment. S1301 to S1306 in FIG. 15 are similar to those explained in FIG. 13, and explanation for those similar processing will be omitted.

In S1501, it is determined whether or not the Q factor calculated in S1304 is less than 40. In the case where the Q factor is less than 40, image degradation is very large, and noise of thick gray may appear, as described above. In this case, even if the number of gradation levels is reduced, the noise does not disappear or may rather be conspicuous in a printing result.

In the case where it is determined in S1501 that the Q factor is less than 40, a larger number of gradation levels in the case where the Q factor is 80 or more (the degree of compression is less than or equal to a threshold value) in FIG. 12 is set as the number of gradation levels to be obtained after gradation conversion. Accordingly, a situation in which noise of thick gray is conspicuous in a printing result can be prevented. Furthermore, with a large number of gradation levels, jaggies can be reduced.

That is, with the process illustrated in FIG. 15, for example, in the case where the quality of printing is standard and printing is performed on normal paper, when the Q factor is 50 or more (the degree of compression is less than or equal to the threshold value) and image degradation is small, the number of gradation levels "3" is set. In the case where the Q factor is equal to or more than 40 and less than 50 and image degradation is relatively large, the number of gradation levels "2" is set. In the case where the Q factor is less than 40 and image degradation is very large, the number of gradation levels "3" is set.

That is, in the case where the Q factor of an image to be printed falls within a range in which reducing the number of gradation levels greatly reduces mosquito noise (in the above example, when the Q factor is equal to or more than 40 and less than 50), the number of gradation levels is reduced. However, in the case where the Q factor of an image to be printed falls within a range in which reducing the number of gradation levels rather enhances mosquito noise (in the above example, when the Q factor is less than 40) (the case where the degree of compression is more than the predetermined threshold value), the number of gradation levels is increased. Accordingly, a situation in which mosquito noise is enhanced can be prevented, and jaggies can be reduced.

An example in which the Q factor of 40 is set as the threshold value used for the determination in S1501 has been described above. However, the present invention is not limited to this. Various threshold values may be set in accordance with various conditions, such as printing settings including the type of an image to be printed and the quality of printing.

In the embodiments described above, processing for reducing mosquito noise against character data has been mainly explained. However, for example, for photographic data, which is not character data, reducing the number of gradation levels reduces the gradation characteristics and increases the difference between adjoining pixels, and jaggies are therefore likely to occur.

Therefore, in execution of acquisition of image data and expansion processing in FIGS. 13 and 15, the number of gradation levels may be determined in accordance with a result of the determination as to whether the image to be printed mainly contains characters or mainly contains natural images, as well as the Q factor.

As described above, in the case of characters, mosquito noise is more likely to be conspicuous than natural images, and the noise greatly affects a printing result. In the case where a determination result that the image to be printed mainly contains characters is obtained, by reducing the number of gradation levels compared to the case where it is determined that the image to be printed mainly contains natural images, the influence of mosquito noise on characters can be reduced.

As a method for determining the contents of an image, for example, the contents of the image to be printed are confirmed by analyzing an image decoded in S1303. As another method, for example, an application used when image data was created is identified, and the image data may be determined to mainly contain characters when, for example, a document creation application is identified, and may be determined to mainly contain natural images when, for example, a photograph management application is identified.

Alternatively, attached information of image data may include information indicating whether or not data other than character data is contained in the original image, as well as various parameters used when the image data was compressed. When the attached information is acquired, it may be determined whether the original data contains data other than character data.

Figure 16:
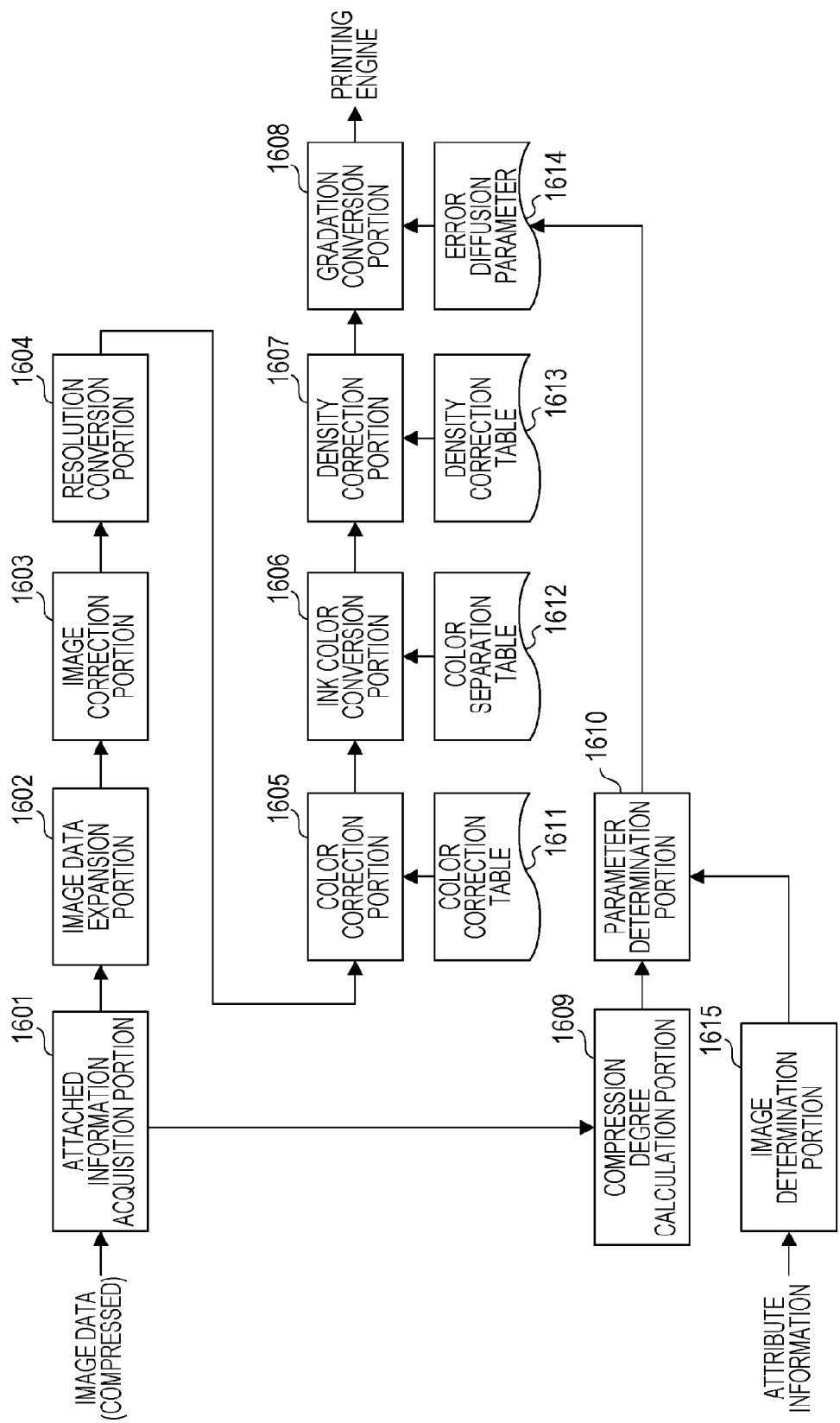
FIG. 16 illustrates a block diagram of a firmware configuration according to an embodiment.

FIG. 16 illustrates an example of a block diagram of a firmware configuration according to an embodiment. Reference numerals 1601 to 1609 and 1611 to 1614 in FIG. 16 are similar to reference numerals 301 to 309 and 311 to 314 explained in FIG. 3, and explanation for those similar parts will be omitted.

In FIG. 16, an image determination portion 1615 acquires attribute information and determines whether or not image data to be printed is constituted of only character information. The attribute information mentioned above may be contained as attached information of image data in an image file or may be acquired separately from the image file.

Then, the image determination portion 1615 transmits image determination information indicating the contents of the image determined as described above to a parameter determination portion 1610. The parameter determination portion 1610 determines the number of gradation levels to be obtained after gradation conversion in accordance with the image determination information.

Figure 17:
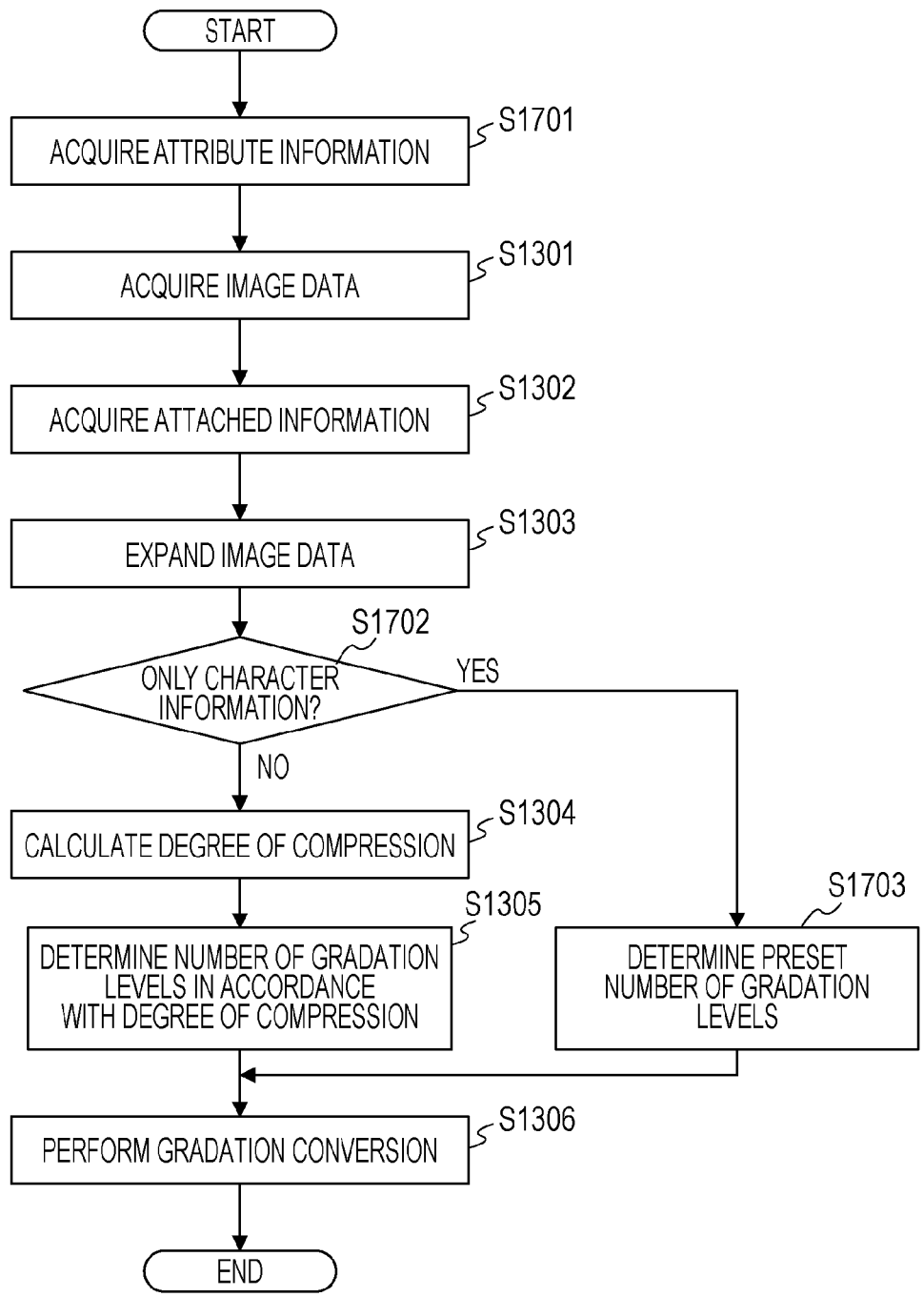
FIG. 17 is a flowchart illustrating a process for determining the number of gradation levels in accordance with the contents of an image.

A method for setting the number of gradation levels by the parameter determination portion 1610 will be described below with reference to FIG. 17. FIG. 17 is a flowchart illustrating a process for determining the number of gradation levels in accordance with the contents of an image. S1301 to S1306 in FIG. 17 are similar to those explained in FIG. 13, and explanation for those similar processing will be omitted.

In S1701, attribute information indicating whether or not the image data to be printed is constituted of only character information is acquired. After decoding processing for the image data is performed in S1301 to S1303, the process proceeds to S1702.

In S1702, it is determined, on the basis of the attribute information acquired in S1701, whether or not the image data to be printed is constituted of only character information.

When it is determined in S1702 that the image to be printed is constituted of only character information, processing similar to that explained with reference to FIG. 13 is performed in S1304 to S1306.

When it is not determined in S1702 that the image to be printed is constituted of only character information, the number of gradation levels is not set in accordance with the degree of compression but a predetermined number of gradation levels is set. The number of gradation levels set in S1702 is greater than or equal to the number of gradation levels set in S1305.

With the process illustrated in FIG. 17, for example, in the case of photographic data, which is not character information, gradation conversion can be performed so that the number of gradation levels is greater than the case of character information. In the case of a natural image, such as a photograph, mosquito noise is less conspicuous than characters and the influence of jaggies on the natural image is large. Therefore, it is often desirable that the number of gradation levels for a natural image is greater than that for characters. With the process illustrated in FIG. 17, in the case where the image to be printed contains a natural image, the number of gradation levels can be set to be greater than that for the case of characters. In contrast, in the case where the image to be printed is constituted of only character information which is greatly affected by mosquito noise, the number of gradation levels for reducing the influence of noise can be set in accordance with the degree of compression.

In the example illustrated in FIG. 17, the determination as to whether or not the image to be printed is constituted of only characters is performed. However, the present invention is not limited to this. For example, it may be determined whether or not the image to be printed contains characters, whether or not the image to be printed contains natural images, or whether or not the image to be printed is constituted of only natural images.

Furthermore, the determination of the contents of the image is not necessarily performed by acquiring the above-mentioned attribute information. For example, the determination of the contents of the image may be performed by analyzing an expanded image. In this case, for example, the image may be divided in units of blocks, the contents of the image may be determined for each block, and the number of gradation levels may be determined for each block in accordance with the contents.

In the foregoing embodiments, an example in which a printing apparatus operates as an information processing apparatus and acquisition processing of lossy-compressed image data, expansion processing of the lossy-compressed image data, gradation conversion processing, and the like illustrated in FIGS. 13, 15, and 17 are performed in the printing apparatus has been explained. However, the present invention is not limited to the above configuration. Various apparatuses (devices including a personal computer (PC), a smartphone, a tablet, and a server on a network) which are connected to the printing apparatus and cause the printing apparatus to print an image based on data to be printed may operate as an information processing apparatus according to an embodiment. In this case, for example, when a printer driver and an application corresponding to the above-described processing are installed into any of the above various apparatuses and the apparatus executes the printer driver and the application program, the above-described processing is implemented. Furthermore, in the various apparatuses, the above-described processing may be performed by the printer driver and the application in a shared manner.

Furthermore, acquisition processing of lossy-compressed image data, expansion processing for the image data, gradation conversion processing, and the like may be performed by cooperation between the various apparatuses and the printing apparatus. For example, processing up to expansion processing of image data in S1301 to S1303 in FIG. 13 is performed in the various apparatuses. Then, by transmitting the expanded image data and a Q table used for the expansion processing to the printing apparatus, the processing from S1304 to S1306 may be performed by the printing apparatus. Alternatively, in the various apparatuses, the processing for determining the number of gradation levels in accordance with the degree of compression in S1305 may be performed, and the printing apparatus may be informed of the determined number of gradation levels. When the processing of S1306 is performed by the printing apparatus, gradation conversion corresponding to the number of gradation levels informed from the various apparatuses may be performed by the printing apparatus. Various methods may be adopted as a method for sharing processing between the above various apparatuses and the printing apparatus.

Furthermore, although a Q table is acquired as various parameters used when image data was compressed and the degree of compression of the image data is determined by calculating a Q factor with reference to the acquired Q table in the foregoing embodiments. However, the present invention is not limited this. For example, identification information for identifying the degree of compression may be various types of information, such as information indicating execution or non-execution of compression, information indicating the compression ratio, and information indicating a Q factor as a numerical value.

For example, in the case where information indicating execution or non-execution of compression is acquired, the number of gradation levels may be set to 2 when the acquired information indicates "execution" of compression and set to 3 when the acquired information indicates "non-execution" of compression. Since mosquito noise is generated by compression and expansion in the lossy compression method, information indicating execution or non-execution of lossy compression may be acquired. The case where the information indicates "non-execution" of lossy compression may include a case where lossless compression is performed on image data, as well as a case where compression processing is not performed. Even in this case, for example, the number of gradation levels equivalent to that for the case where compression processing is not performed is set.

Furthermore, in the foregoing embodiments, the number of gradation levels corresponding to the degree of compression of an image to be printed is set in advance in a table, and the number of gradation levels in printing is set by referring to the table at the time of printing. However, the present invention is not limited to this. The data format of information indicating the number of gradation levels is not necessarily a table and may be in various forms. Furthermore, such information is not necessarily set in advance. At the time of printing, a new number of gradation levels may be determined.

For example, at the time when the printing apparatus receives a print job from an external apparatus, the process illustrated in FIG. 9 is performed, and the number of gradation levels corresponding to the degree of compression is set. Then, the number of gradation levels corresponding to the image may be set in accordance with the degree of compression of the image to be printed corresponding to the print job. In this case, character data as a sample for performing the process illustrated in FIG. 9 may be received along with the print job from the external apparatus.

Alternatively, the process illustrated in FIG. 9 is performed for a white region in the image to be printed corresponding to the print job, and the degree of occurrence of noise at the time when gradation conversion is performed with the various numbers of gradation levels is determined. Then, in accordance with the degree of occurrence of noise determined as described above, the number of gradation levels in printing of the image may be determined.

Furthermore, in the case where the process illustrated in FIG. 9 is performed at the time of printing as described above, it may be determined whether the image data to be printed in the printing has been compressed in the lossy compression method. After confirming that the image data has been compressed in the lossy compression method, the process illustrated in FIG. 9 may be performed so that the number of gradation levels corresponding to the degree of compression can be determined. In the case where compression is not performed in the lossy compression method, when compression is not performed or compression is performed in a lossless compression method, gradation conversion is performed in accordance with a predetermined number of gradation levels. In the case where a certain number of gradation levels is specified as the predetermined number of gradation levels using a printing mode or the like, the specified number of gradation levels may be adopted. If a specified number of gradation levels does not exist, for example, the maximum number of gradation levels that is possible for the printing apparatus may be adopted.

In the flowcharts illustrated in FIGS. 13. 15, and 17, after expansion processing for image data is performed, processing for determining the number of gradation levels corresponding to the degree of compression is performed. However, the present invention is not limited to this. The processing for determining the number of gradation levels may be performed before expansion processing, and gradation conversion to achieve the determined number of gradation levels may be performed for the image data on which the expansion processing has been performed.

Furthermore, in the foregoing embodiments, as an example of halftone processing by gradation conversion, the case of an error diffusion method has been explained. However, the present invention is not limited to this. For example, dithering method may be used. In the dithering method, gradation conversion is performed by applying a predetermined dither matrix indicating a threshold value for performing gradation conversion to multi-valued image data. Also in the dithering method, the influence of noise is changed by the number of gradation levels obtained by gradation conversion. However, by determining the number of gradation levels in accordance with the degree of compression as in the foregoing embodiments, the influence of noise can be reduced.

Furthermore, although an example in which gradation conversion of image data is performed for printing by a printing apparatus has been explained above in the foregoing embodiments, the present invention is not limited to this. For example, in the case where an image is displayed on a display device, gradation conversion according to the foregoing embodiments may be performed. In this case, the display device that performs display may perform determination of the number of gradation levels to be obtained by gradation conversion and then perform gradation conversion. Alternatively, various external apparatuses that output images to the display device may determine the number of gradation levels. In the case where the external apparatus determines the number of gradation levels, gradation conversion into the determined number of gradation levels may be performed by the external apparatus or the display device.

Furthermore, although an example of a JPEG method has been explained in the foregoing embodiments as an example of lossy compression method in image compression, the present invention is not limited to this. Processes according to the foregoing embodiments can be applied to various lossy compression methods.

Furthermore, although an example of data of a still image has been explained as an example of lossy-compressed data to be processed in the foregoing embodiments, the present invention is not limited to this. For example, in the case where a moving image in an MPEG method or the like is displayed or a frame extracted from such a moving image is printed, the number of gradation levels may be reduced. Even in such a case, the processing in the foregoing embodiments may be used.

Furthermore, data to be processed is not necessarily an image. The data to be processed may be, for example, audio data compressed in the lossy compression method. In the case where such audio data is expanded, due to the lossy compression method, noise sound may be generated. Furthermore, in particular, when the number of gradation levels of sound is reduced, the noise sound may be enhanced. In such a situation, by determining the number of gradation levels to be obtained after gradation conversion in accordance with the degree of compression of audio data according to the foregoing embodiments, enhancement of noise sound may be prevented.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Furthermore, a program code for implementing functions of an embodiment may be executed by a single computer (a central processing unit (CPU) or a microprocessing unit (MPU)) or may be executed by multiple computers which cooperate with each other. Furthermore, a program code may be executed by a computer or hardware, such as a circuit for implementing the functions of the program code, may be provided. Furthermore, part of the program code may be implemented by hardware and the other parts may be executed by a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-265235, filed Dec. 24, 2013, which is hereby incorporated by reference herein in its entirety.

What is claimed is:

1. An information processing apparatus comprising:
a memory configured to store a program; and
a processor configured to execute the program stored in the memory,
wherein the processor is to acquire information corresponding to a degree of compression of lossy-compressed data to be processed corresponding to a predetermined number of gradation levels; and
determine, based on the acquired information, a number of gradation levels to be obtained after the lossy-compressed data corresponding to the predetermined number of gradation levels is expanded and gradation conversion is performed so that the predetermined number of gradation levels of the expanded data is reduced, and
wherein the processor determines a first number of gradation levels as the number of gradation levels in a case where the degree of compression of the data to be processed is more than a first threshold value, and determines a second number of gradation levels as the number of gradation levels in a case where the degree of compression of the data to be processed is less than or equal to the first threshold value, the first number of gradation levels being smaller than the second number of gradation levels.

2. The information processing apparatus according to claim 1, wherein the processor determines a third number of gradation levels of the number of gradation levels in a case where the degree of compression is more than a second threshold value greater than the first threshold value, the third number of gradation levels being greater than the first number of gradation levels.

3. The information processing apparatus according to claim 1, wherein the processor is further configured to perform gradation conversion on the lossy-compressed data.

4. The information processing apparatus according to claim 3, wherein the processor configured to output data on which the gradation conversion has been performed by the gradation conversion unit to a predetermined apparatus that performs predetermined processing on the data.

5. The information processing apparatus according to claim 4, wherein the lossy-compressed data includes image data, and the predetermined apparatus performs, as the predetermined processing, printing or display of an image based on image data output by the processor.

6. The information processing apparatus according to claim 5, wherein the processor determines the number of gradation levels to be obtained when gradation conversion is performed in half tone processing in an error diffusion method for the image data for printing by the predetermined apparatus.

7. The information processing apparatus according to claim 5, wherein the processor determines the number of gradation levels in accordance with the degree of compression and a printing setting for printing of the image by the predetermined apparatus.

8. The information processing apparatus according to claim 5, wherein the processor determines the number of gradation levels in accordance with the degree of compression and contents of the image based on the image data.

9. The information processing apparatus according to claim 8, wherein the processor determines the number of gradation levels in accordance with a result of a determination as to whether a character is contained in the image as the contents of the image.

10. The information processing apparatus according to claim 5, further comprising a printing unit configured to print the image based on the image data output by the processor.

11. The information processing apparatus according to claim 1, wherein the lossy-compressed data to be processed is audio data.

12. The information processing apparatus according to claim 1, wherein the lossy-compressed data to be processed is image data which has been compressed in a Joint Photographic Expert Group format.

13. The information processing apparatus according to claim 1, wherein the process is further configured to perform expansion processing for the lossy-compressed data, wherein the processor determines the number of gradation levels when gradation conversion of expanded data which is obtained by expanding of the lossy-compressed data is performed.

14. The information processing apparatus according to claim 13, wherein the processor acquires, as information corresponding to the degree of compression, information used when the lossy-compressed data was lossy-compressed, and wherein the processor performs the expansion processing based on the acquired information, and the processor determines the number of gradation levels based on the information.

15. The information processing apparatus according to claim 14, wherein the processor acquires, as information corresponding to the degree of compression, information used for quantization processing when the lossy-compressed data was lossy-compressed.

16. The information processing apparatus according to claim 15, wherein the degree of compression is a Quantization factor corresponding to the quantization processing when the lossy-compressed data was lossy-compressed.

17. An information processing method performed by a processor by executing a program stored in a memory, the method comprising comprising:
an acquisition step of acquiring information corresponding to a degree of compression of lossy-compressed data to be processed corresponding to a predetermined number of gradation levels; and
a determination step of determining, based on information acquired in the acquisition step, a number of gradation levels to be obtained after the lossy-compressed data is expanded and gradation conversion is performed so that the predetermined number of gradation levels of the expanded data is reduced,
wherein in the determination step, a first number of gradation levels is determined as the number of gradation levels in a case where the degree of compression of the data to be processed is more than a first threshold value, and a second number of gradation levels is determined as the number of gradation levels in a case where the degree of compression of the data to be processed is less than or equal to the first threshold value, the first number of gradation levels being smaller than the second number of gradation levels.

18. A storage medium storing a program for causing a computer to perform the information processing method according to claim 17.

* * * * *